United States Patent
Nakano et al.

(10) Patent No.: US 7,012,964 B1
(45) Date of Patent: Mar. 14, 2006

(54) METHOD AND DEVICE FOR DATA TRANSMISSION

(75) Inventors: Hiroshi Nakano, Kanagawa (JP);
Yasuo Iwasaki, Kanagawa (JP);
Yoshihiro Murakami, Kanagawa (JP);
Tetsuya Iwamoto, Kanagawa (JP);
Katsumi Tahara, Kanagawa (JP);
Hitoshi Sakamoto, Kanagawa (JP);
James Hedley Wilkinson, Basingstoke (GB)

(73) Assignees: Sony Corporation, Tokyo (JP); Sony United Kingdom Limited, Basingstoke (GB)

( * ) Notice: Subject to any disclaimer, the term of this patent is extended or adjusted under 35 U.S.C. 154(b) by 0 days.

(21) Appl. No.: 09/719,791

(22) PCT Filed: Apr. 16, 1999

(86) PCT No.: PCT/JP99/02046

§ 371 (c)(1),
(2), (4) Date: Mar. 26, 2001

(87) PCT Pub. No.: WO00/64161

PCT Pub. Date: Oct. 26, 2000

(51) Int. Cl.
*H04N 7/12* (2006.01)
*H04N 11/02* (2006.01)

(52) U.S. Cl. .................................. 375/240.28
(58) Field of Classification Search ............ 375/240.28, 375/240.26, 240.01, 240.27, 240.1; 386/103, 386/125, 45, 55, 105, 52; 348/722, 705, 348/426.1
See application file for complete search history.

(56) References Cited

U.S. PATENT DOCUMENTS

| | | | | |
|---|---|---|---|---|
| 5,923,384 A | * | 7/1999 | Enomoto et al. | ............ 348/705 |
| 6,278,739 B1 | * | 8/2001 | Enomoto et al. | ...... 375/240.26 |
| 6,591,057 B1 | * | 7/2003 | Nagasawa | ..................... 386/52 |
| 6,658,060 B1 | * | 12/2003 | Otaka et al. | ........... 375/240.26 |
| 6,834,083 B1 | * | 12/2004 | Tahara et al. | .......... 375/240.28 |
| 2003/0095787 A1 | * | 5/2003 | Nagasawa | ..................... 386/52 |

FOREIGN PATENT DOCUMENTS

| | | |
|---|---|---|
| JP | 55-053740 | 4/1980 |
| JP | 62-129654 | 6/1987 |
| JP | 05-046550 | 2/1993 |

OTHER PUBLICATIONS

Yoshio Kamiura, "Packet densou SDTI (Serial Data Transport Interface)" Eizou Jouhou Media Gakkaishi, vol. 51 No. 11, pp. 1826 to 1834 (Tokyo) 1997.

* cited by examiner

*Primary Examiner*—Vu Le
*Assistant Examiner*—Behrooz Senfi
(74) *Attorney, Agent, or Firm*—Frommer Lawrence & Haug LLP; William S. Frommer; Thomas F. Presson

(57) ABSTRACT

Data indicative of a transfer mode of a transmission packet may be inserted into a payload portion contained in a serial digital transfer interface (SDTI) transmission packet. Also, data indicative of a timing mode of the transmission packet may be inserted into this payload portion. As the transfer mode, there may be provided a synchronous transfer mode and an isochronous transfer mode in addition to an asynchronous transfer mode. A timing mode may prescribe a timing mode in which a transmission packet may be transferred in synchronism with a field of a transmission frame. There may be provided a normal mode using a first field, an advanced mode using a second field and a dual mode using both fields. Depending upon the manner in which the timing mode is set, a system delay between the transmission and the reception can be minimized.

12 Claims, 29 Drawing Sheets

F I G. 1
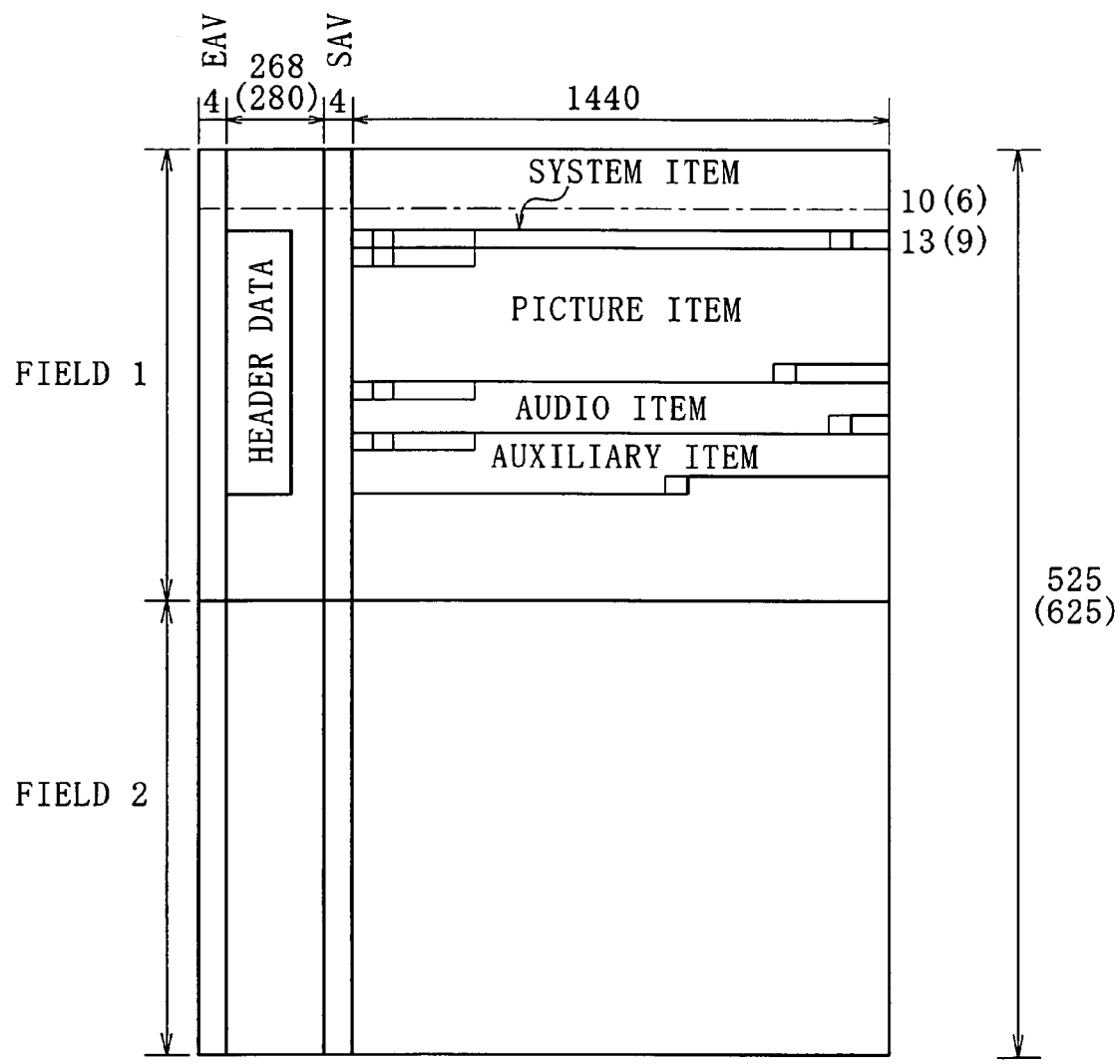

F I G. 6
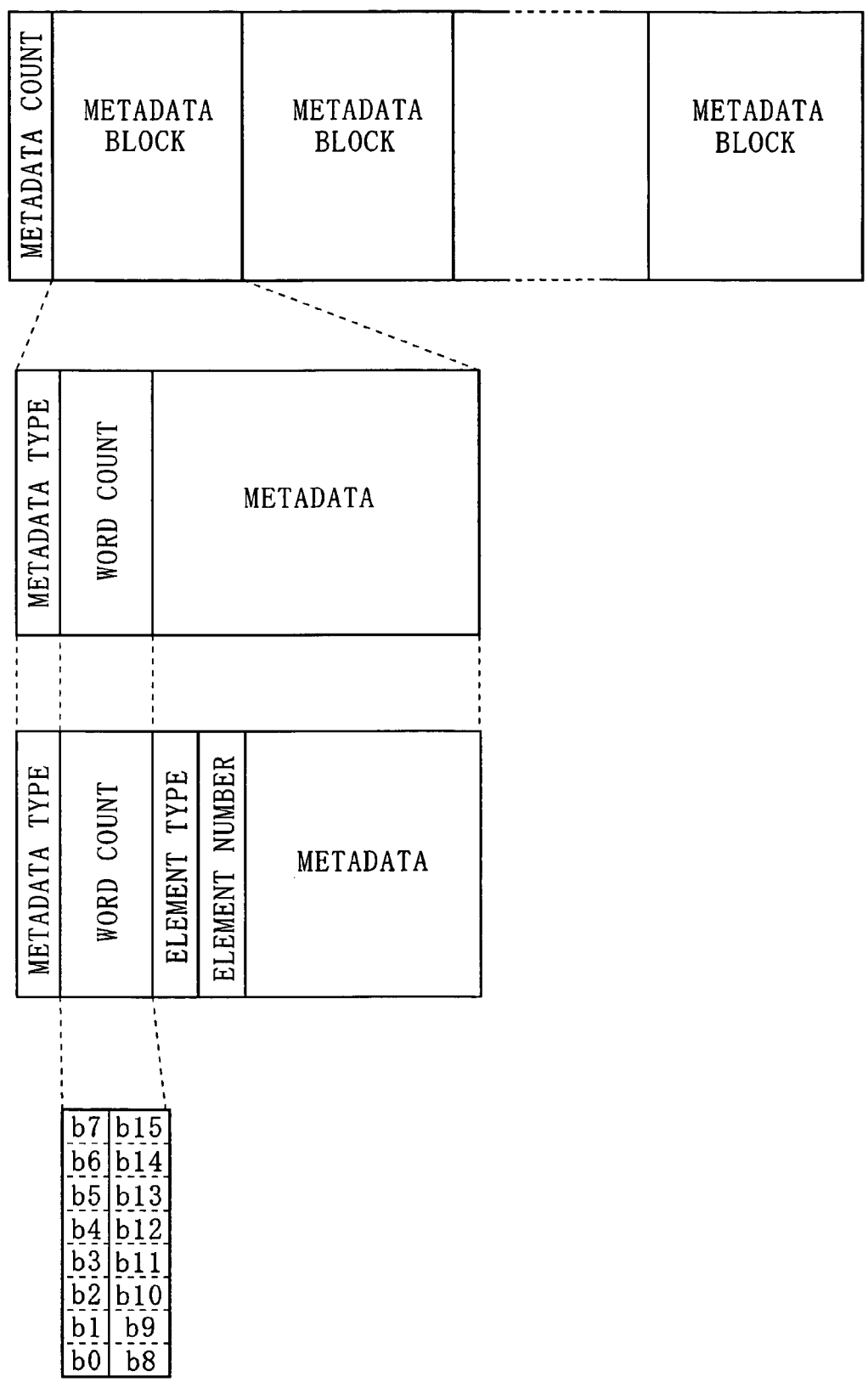

FIG. 9

| PICTURE EDITING BITMAP | | |
|---|---|---|
| | b7 | EDIT FLAG |
| | b6 | — |
| | b5 | ERROR FLAG |
| | b4 | — |
| | b3 | PICTURE CODING VALID |
| | b2 | PROFILE/LEVEL VALID |
| | b1 | HV SIZE VALID |
| | b0 | USER BITMAP VALID |

| PICTURE CODING | | |
|---|---|---|
| | b7 | CLOSED GOP |
| | b6 | BROKEN LINK |
| | b5 | PICTURE CODING TYPE |
| | b4 | |
| | b3 | |
| | b2 | RESERVED |
| | b1 | |
| | b0 | |

| MPEG USER BITMAP | | |
|---|---|---|
| | b7 | HISTORY DATA |
| | b6 | ANC DATA |
| | b5 | VIDEO INDEX |
| | b4 | PICTURE ORDER |
| | b3 | TIMECODE 2 |
| | b2 | TIMECODE 1 |
| | b1 | H-PHASE |
| | b0 | V-PHASE |

FIG. 13

| TRANSFER MODE / TIMING MODE | SYNCHRONOUS (SYNCHRONOUS) | ISOCHRONOUS (ISOCHRONOUS) | ASYNCHRONOUS (ASYNCHRONOUS) |
|---|---|---|---|
| NORMAL (NORMAL) | STANDARD ONE-TIME NORMAL SPEED | STANDARD VARIABLE SPEED | ASYNCHRONOUS PACKING |
| ADVANCED (ADVANCED) | O/E INVERSION | O/E INVERSION VARIABLE SPEED | |
| DUAL (DUAL) | FIELD PACKING | FIELD PACKING | |
| RESERVED | NOT PRESCRIBED | NOT PRESCRIBED | |

NORMAL

ADVANCED

DUAL

NORMAL

ADVANCED

DUAL

NORMAL

ADVANCED

DUAL

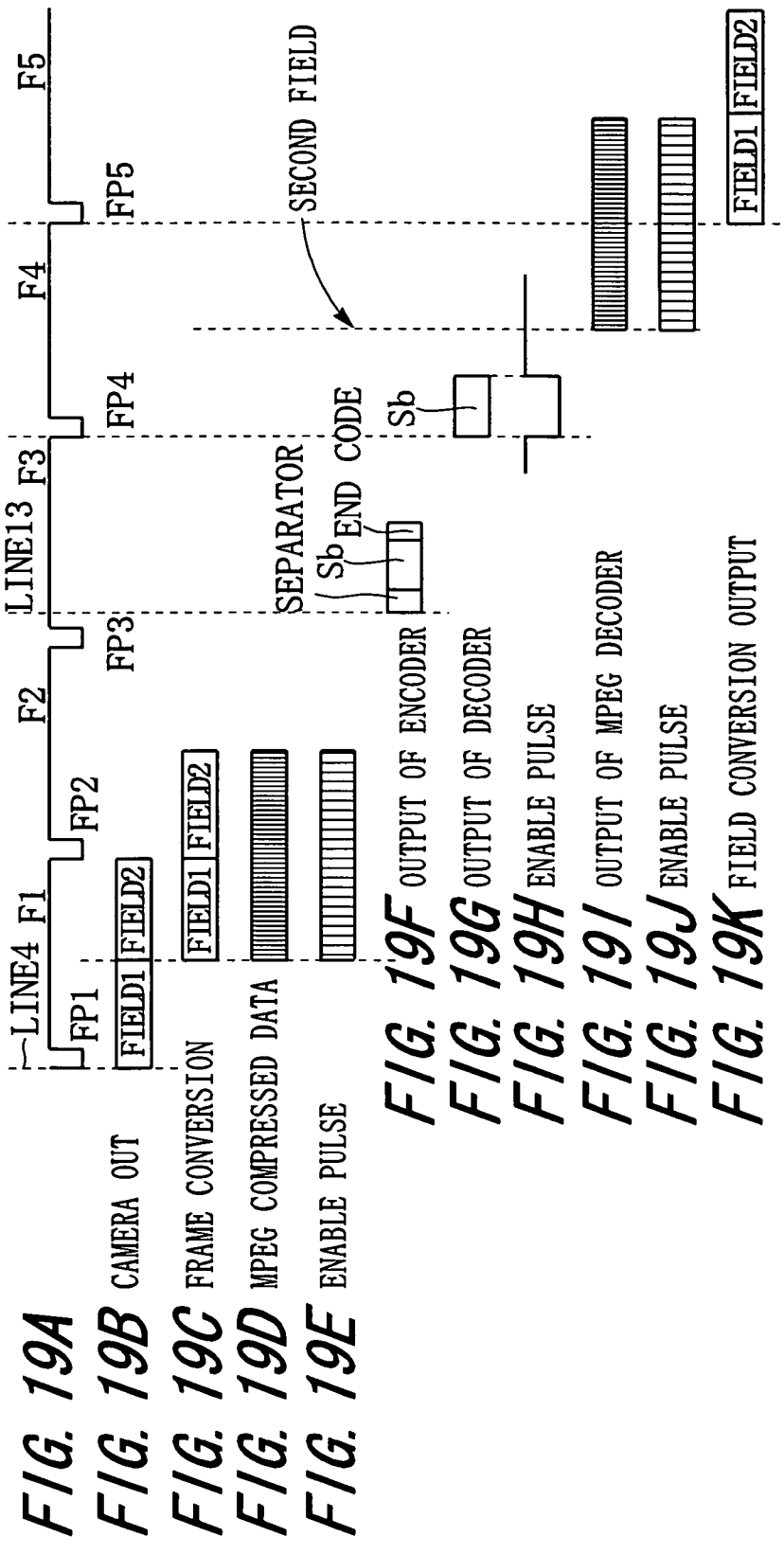

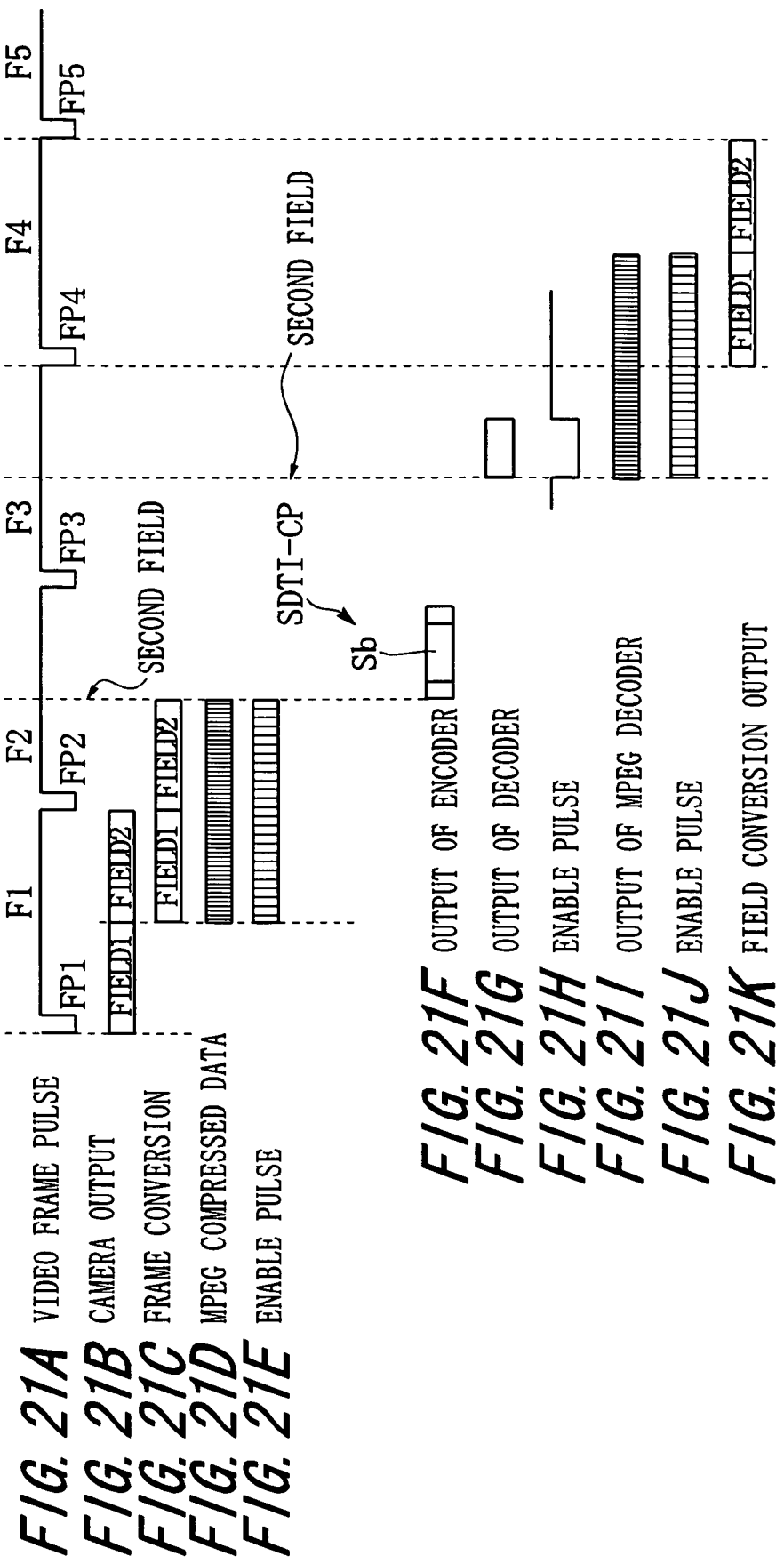

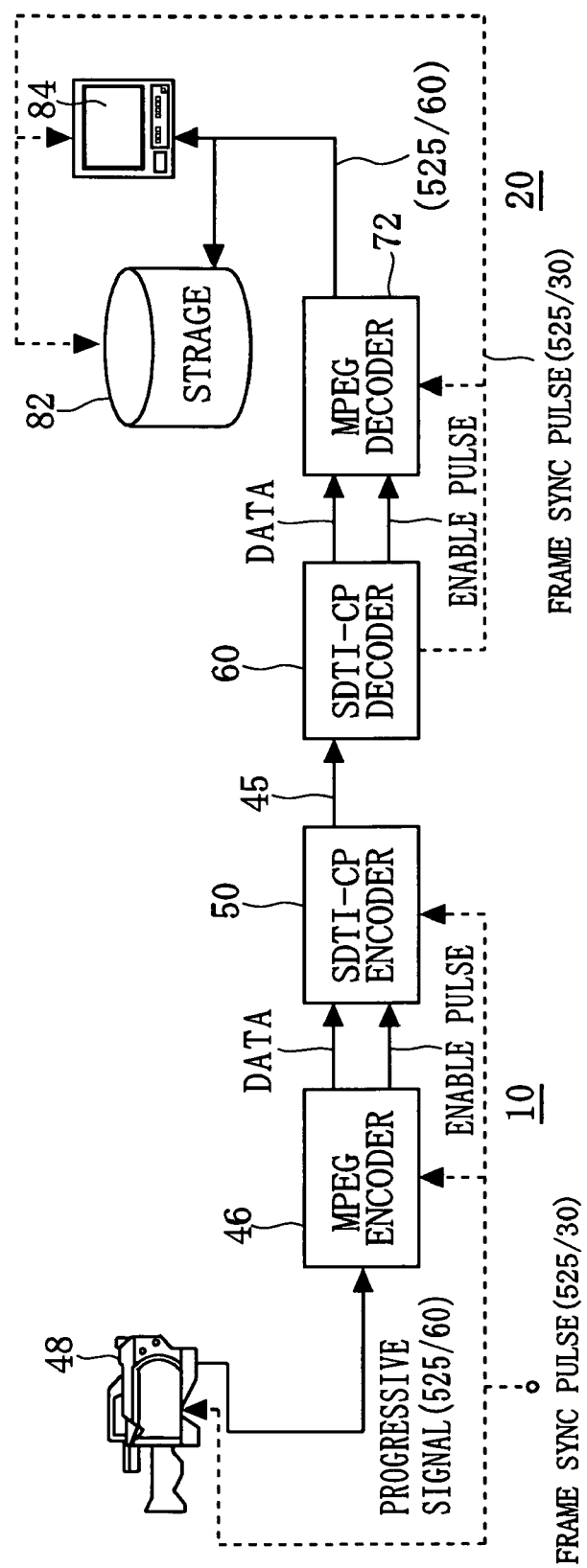

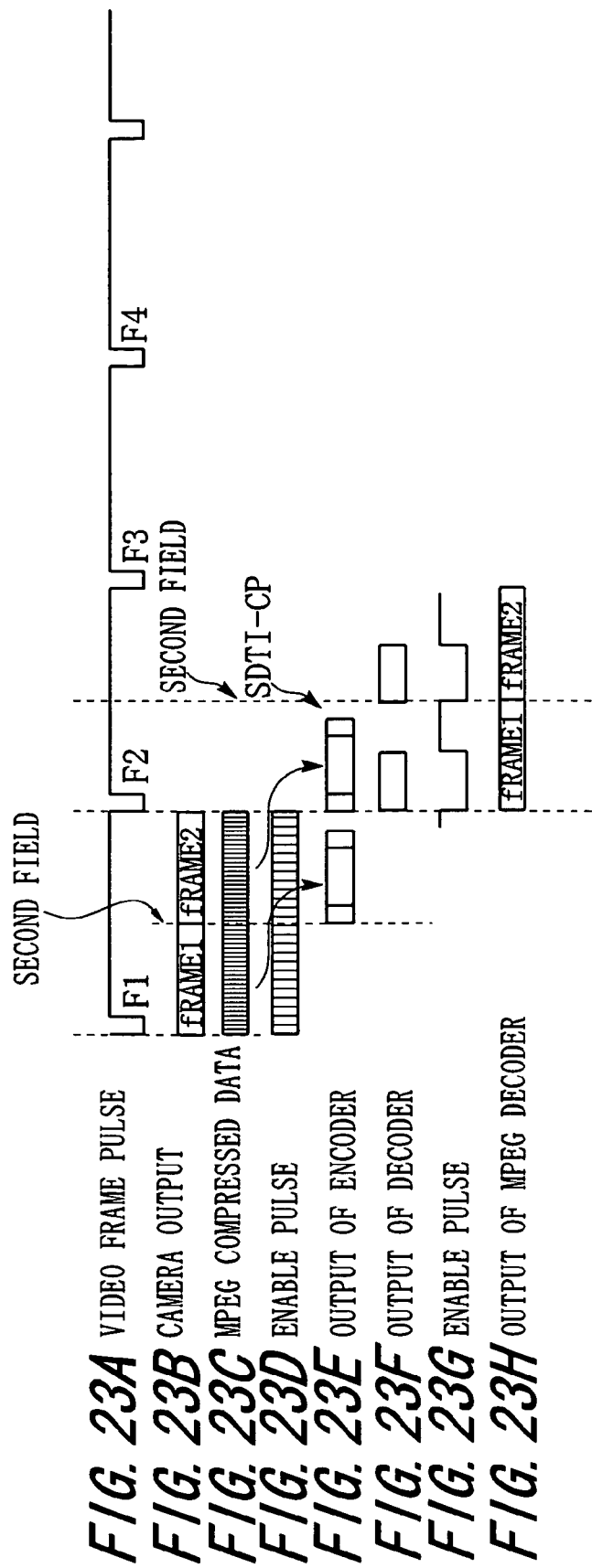

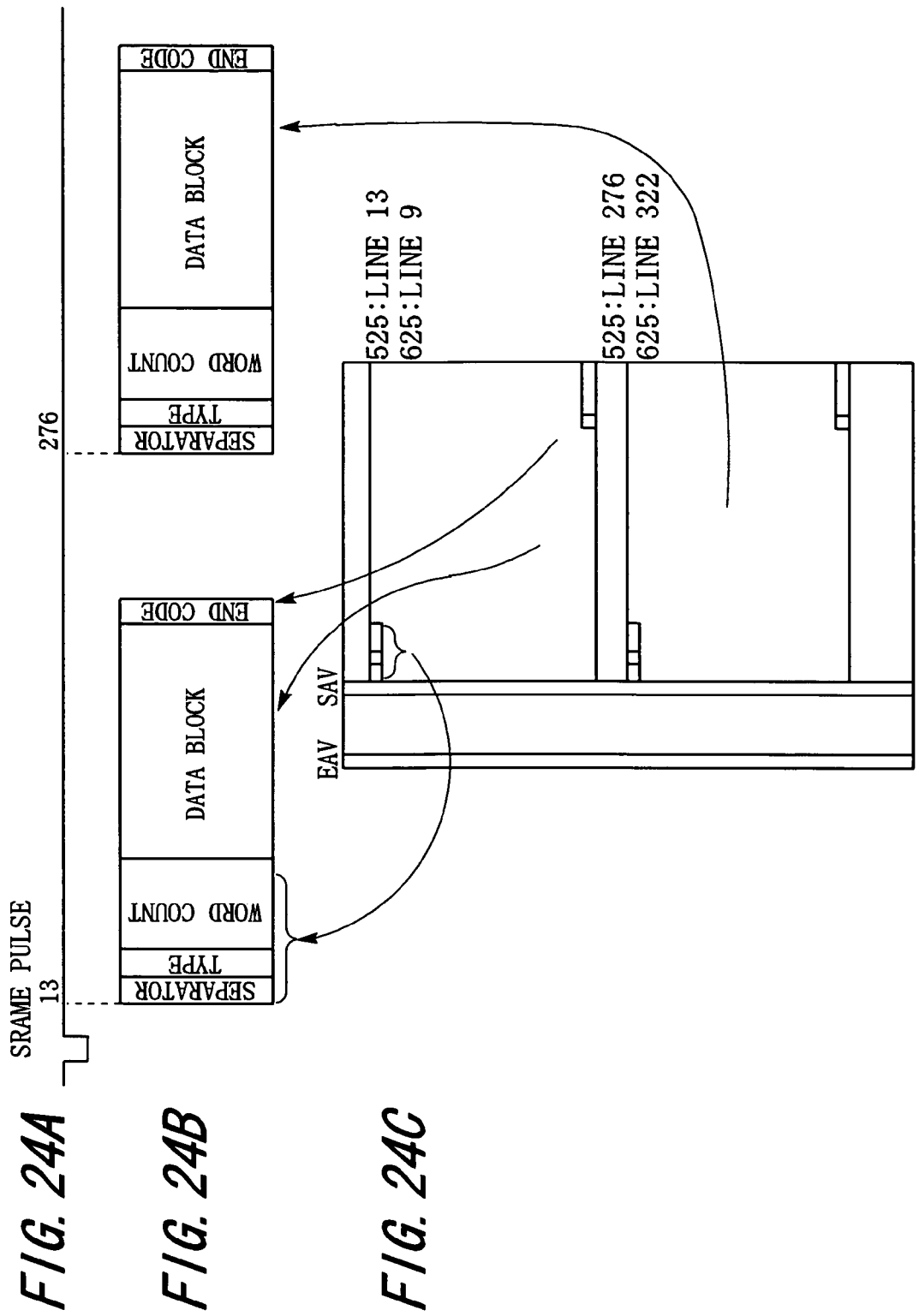

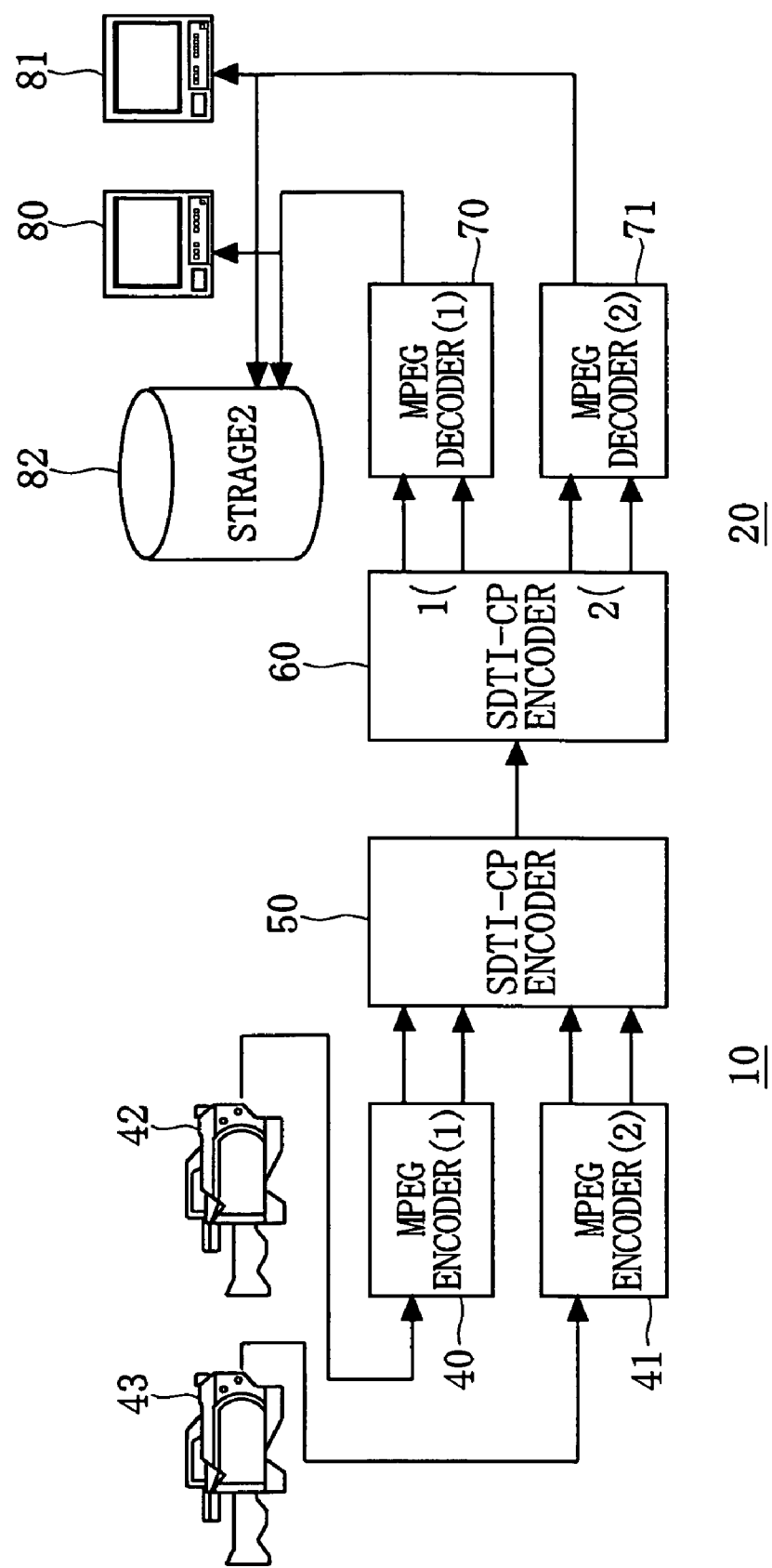

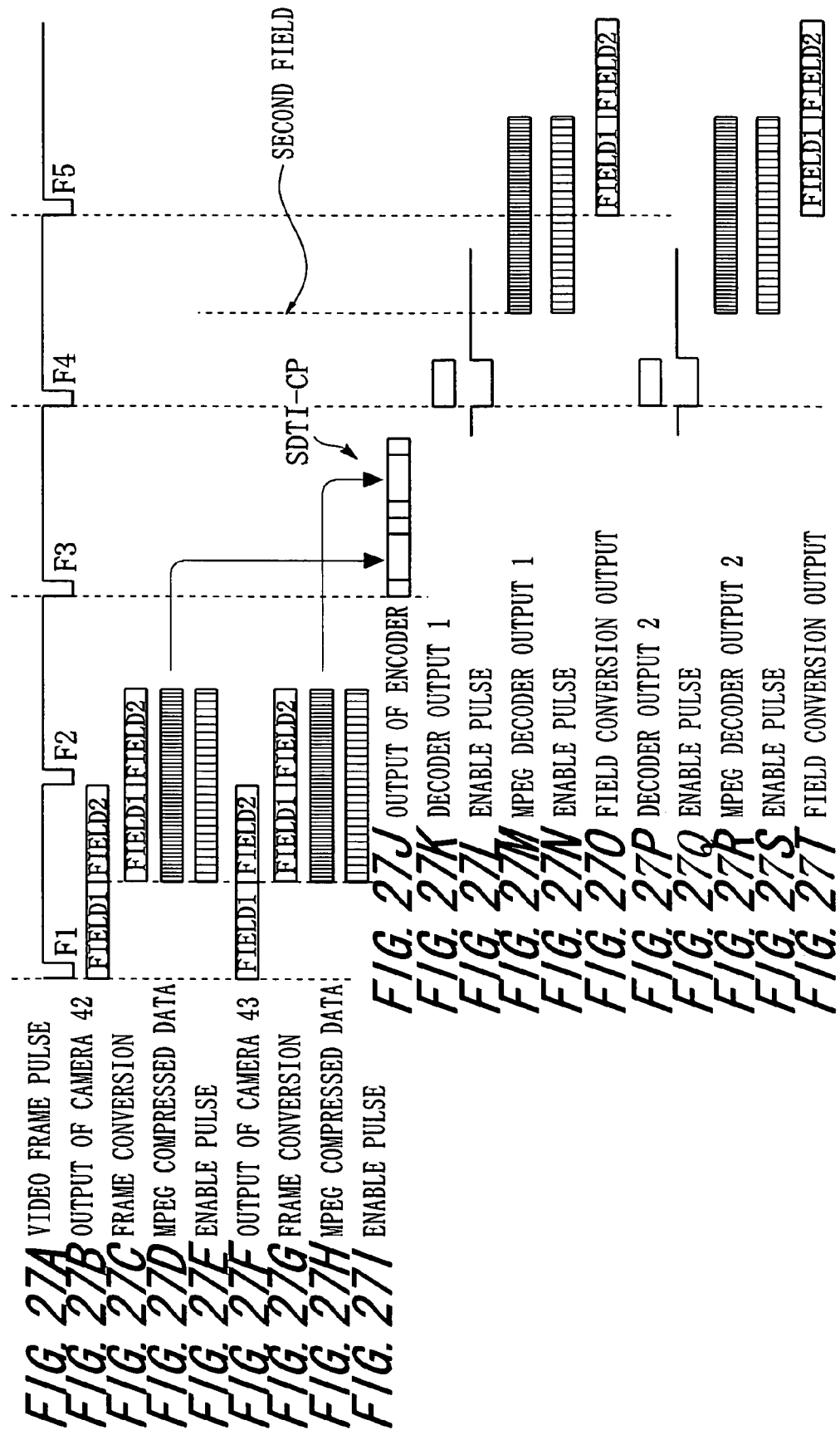

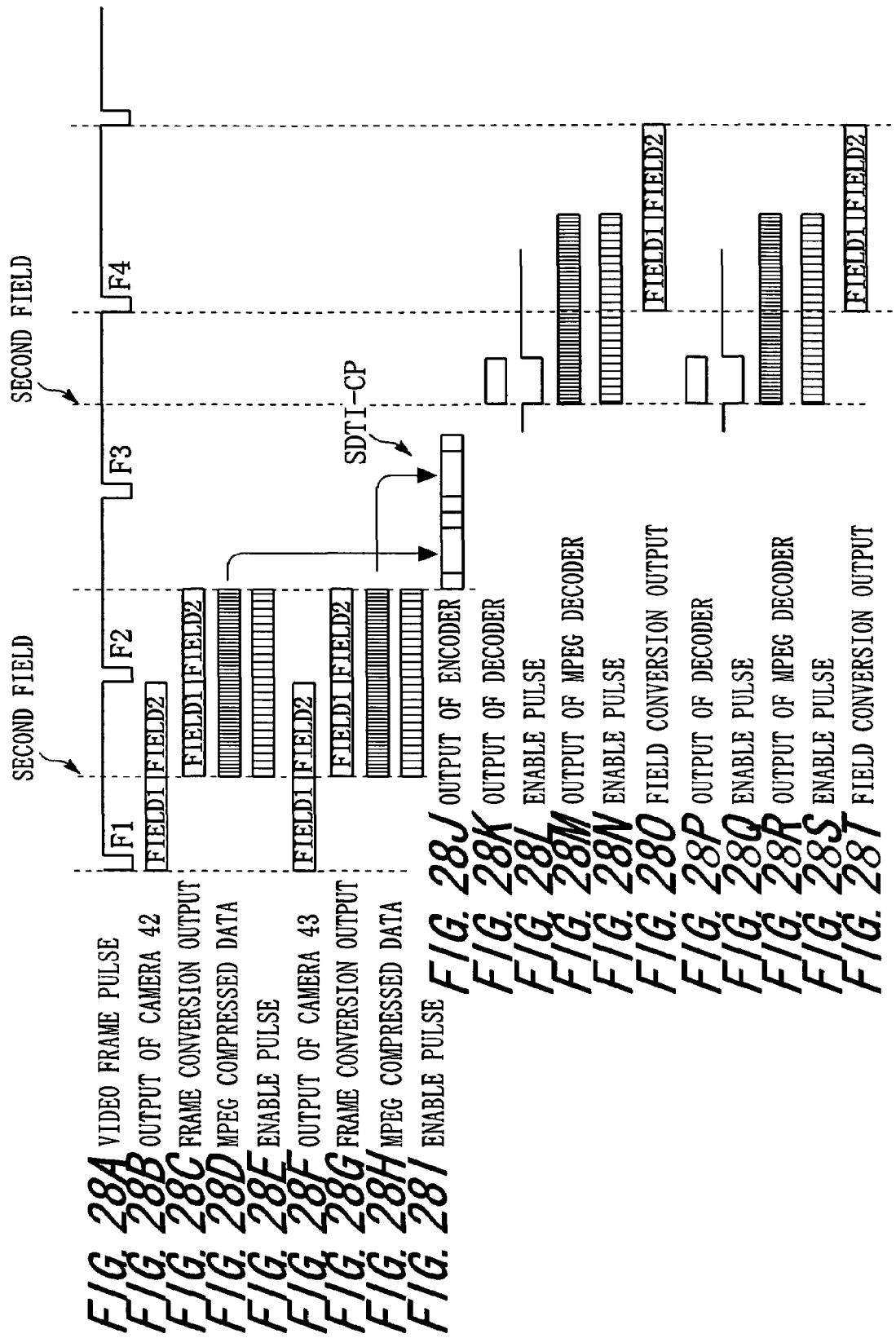

525:LINE 276
625:LINE 322

FIG. 30
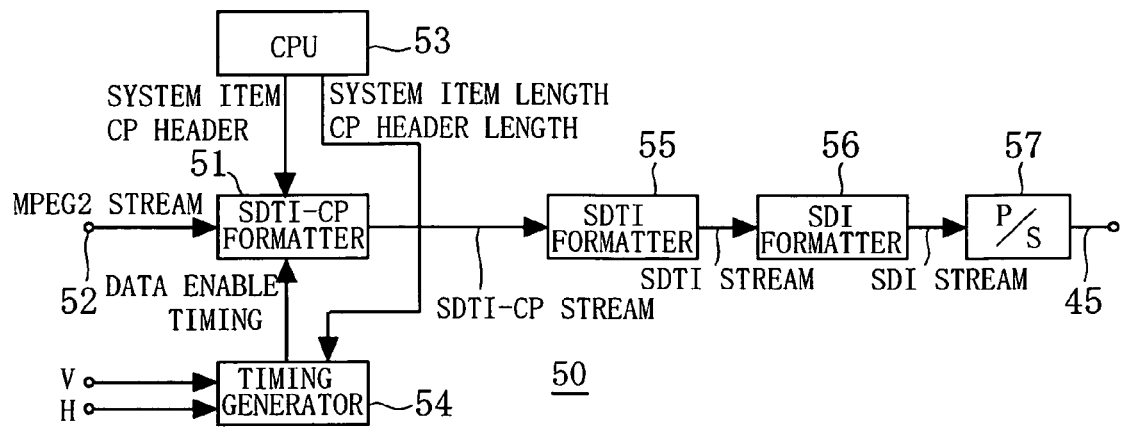
FIG. 31A MPEG2 STREAM
FIG. 31B SDTI-CP STREAM
FIG. 31C DATA ENABLE
FIG. 31D SDTI STREAM
FIG. 31E EXAMPLE OF MAPPING OF SDI STREAM
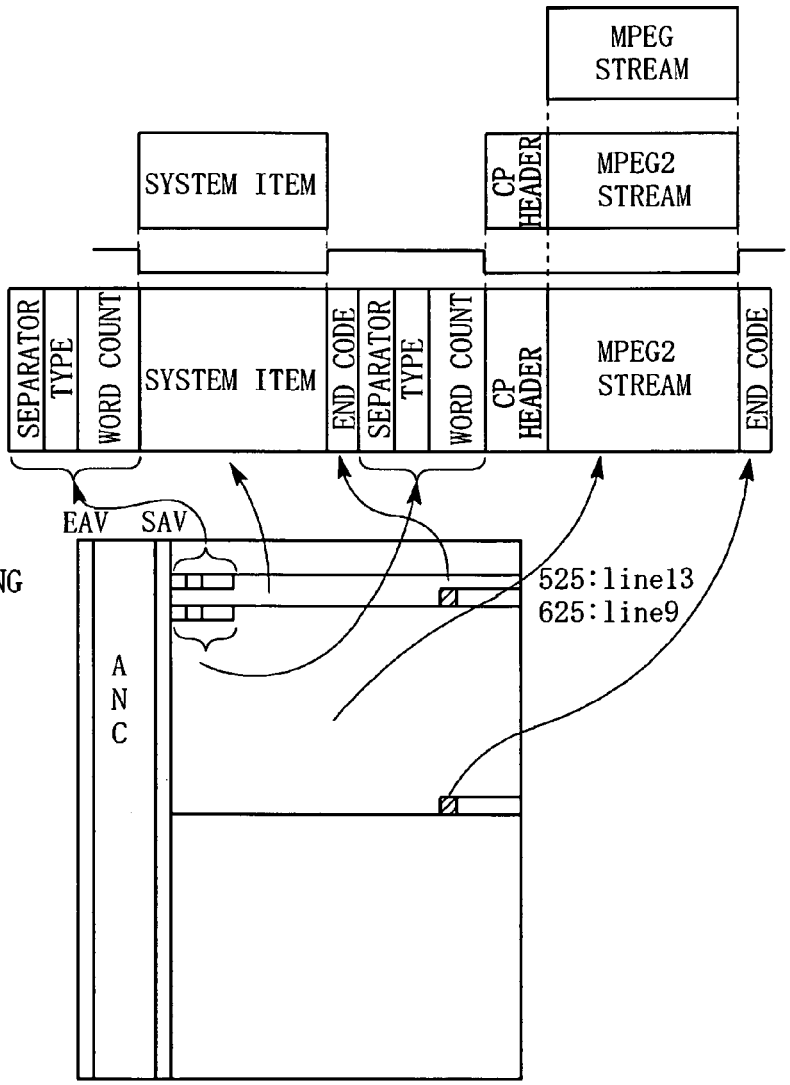

METHOD AND DEVICE FOR DATA TRANSMISSION

TECHNICAL FIELD

This invention relates to a data transmission method and a data transmission apparatus. More particularly, this invention relates to a data transmission method and a data transmission apparatus in which a transmission form which agrees with an object of transmitted data can be realized by prescribing a transfer mode different from an asynchronous transfer mode and by prescribing a timing at which data is transmitted.

BACKGROUND ART

As a transmission format for transmitting digital data, there has heretofore been a digital signal serial transmission format of the SMPTE-259M "10-bit 4:2:2 Component and 4fsc Composite Digital Signals-Serial Digital Interface" (hereinafter referred to as "SDI (Serial Digital Interface) format") standardized according to the SMPTE. This transmission standard may be the standard useful for transmitting a digital component video signal (DI signal), a digital composite signal (D2 signal), or the like.

As is well-known, this transmission format is standardized so as to become able to transmit audio data and other data in the form such that audio data and other data are inserted into an ancillary data area, but is not formatted so as to be able to transmit compressed data (video data) in the form such that compressed data is inserted into an active video area.

The SMPTE-305M "Serial Data Transport Interface" (hereinafter referred to as "SDTI format") is the transmission format standardized such that any compressed data can be transmitted. That is, according to this transmission format, in addition to fixed-length data, variable-length data such as compressed video data and audio data can be inserted into a payload (Payload) portion on the SDTI format corresponding to the active video area ACV of the SDI format and then transmitted.

This SDTI format has not yet determined its concrete data transmission system for transmitting these data.

Therefore, this invention is to solve such problems encountered with the prior art, and is intended to realize a data transmission matched with the transmission object by prescribing the transmission form in which video data should be transmitted together with other data or transmitted solely.

DISCLOSURE OF INVENTION

In a data transmission method according to this invention, there is provided a data transmission method of transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing a video signal is inserted. This transmission method comprises the steps of a first step of inserting data indicative of a transfer mode of the transmission packet into the payload area and a second step of transferring said transmission packet into which the data indicative of the transfer mode was inserted at the first step in the form of serial data.

In a data transmission apparatus according to this invention, there is provided a data transmission apparatus for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing a video signal or an audio signal is inserted. This data transmission apparatus comprises a data compression device for compressing the video signal, an encoder for converting data into the serial digital transfer interface format by inserting the compressed data into the payload area of the transmission packet and a parallel-to-serial converter for converting this encoded output into serial data, wherein the encoder includes a means for inserting data indicative of the transfer mode of the transmission packet into the payload area.

In a data transmission method according to this invention, there is provided a data transmission method of transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing a video signal is inserted. This data transmission method comprises the steps of a first step of inserting data indicative of a timing mode of said transmission packet into the payload area and a second step of transferring the transmission packet into which the data indicative of the timing mode was inserted at the first step in the form of serial data.

In a data transmission apparatus according to this invention, there is provided a data transmission apparatus for transmitting a serial digital transfer interface transmission packet in which an interval of one line of a video frame comprises an end synchronizing code area in which an end synchronizing code is inserted, an ancillary data area into which ancillary data is inserted, a start synchronizing code area into which a start synchronizing code is inserted and a payload area into which data containing a video signal or an audio signal is inserted. This data transmission apparatus comprises a data compression device for compressing the video signal, an encoder for converting data into the serial digital transfer interface format by inserting the compressed data into the transmission packet payload area and a parallel-to-serial converter for converting the encoded output in the form of serial data, wherein the encoder includes a means for inserting data indicative of the timing mode of the transmission packet into the payload area.

According to this invention, the data indicative of the transfer mode of the transmission packet is inserted into the payload portion contained in the serial digital transfer interface (SDTI) transmission packet, to be concrete, an area near a type area indicative of type of data of the data block area of this payload portion. As the transfer mode, there are provided a synchronous transfer mode and an isochronous transfer mode in addition to an asynchronous transfer mode.

When compressed video data or the like is transmitted, data should be transmitted while the transmission side and the reception side are being synchronized with each other. Further, when data is transmitted at a high speed or 2-channel video data are multiplexed and transmitted, data should be transmitted while the transmission side and the reception side are being synchronized with each other.

Also, data indicative of a timing mode used when a transmission packet is transmitted is inserted into the payload portion contained in the SDTI format transmission packet, to be concrete, the area near the type area indicative of type of data of the data block area. The timing mode is set to any of the synchronous transfer mode and the isochronous transfer mode. Depending upon the manner in which the timing mode is set, it is possible to minimize the system delay between the transmission side and the reception side.

BRIEF DESCRIPTION OF DRAWINGS

FIG. 1 is a diagram showing the manner in which data of the SDTI-CP format to which this invention can be applied are mapped.

FIG. 6 is a diagram of a metadata set.

FIG. 9 is a diagram of an MPEG-2 picture editing metadata.

FIG. 13 is a diagram showing a relationship among transfer modes and timing modes.

FIGS. 14A to 4D are diagrams showing a relationship among positions at which content package is inserted in a synchronous transfer mode, an asynchronous transfer mode and timing modes.

FIGS. 19A to 19K are timing charts to which reference will be made in explaining the manner in which data is transferred at the normal timing mode in the synchronous transfer mode.

FIGS. 20A, 20B are timing charts showing a relationship between compressed data and an enable pulse.

FIGS. 21A to 21K are timing charts to which reference will be made in explaining the manner in which data is transferred at the advanced mode in the synchronous transfer mode.

FIG. 22 is a block diagram showing the outline of the data transmission apparatus driven when the dual timing mode in the synchronous transfer mode is employed.

FIGS. 23A to 23H are timing charts to which reference will be made in explaining the manner in which data is transferred at the dual timing mode in the synchronous transfer mode.

FIGS. 24A to 24C are diagrams showing the manner in which data are mapped in the isochronous mode.

FIG. 25 is a block diagram showing the outline of the data transmission apparatus driven when the normal timing mode in the isochronous mode is employed.

FIGS. 27A to 27T are timing charts to which reference will be made in explaining the manner in which data are transferred at the normal timing mode in the isochronous mode.

FIGS. 28A to 28T are timing charts to which reference will be made in explaining the manner in which data are transferred in the advanced timing mode.

FIG. 30 is a block diagram showing a main portion of an SDTI-CP encoder according to the embodiment.

FIGS. 31A to 31E are diagrams showing an example of the manner in which data are mapped and to which reference will be made in explaining an operation of the above encoder.

BEST MODE FOR CARRYING OUT THE INVENTION

Figure 2:
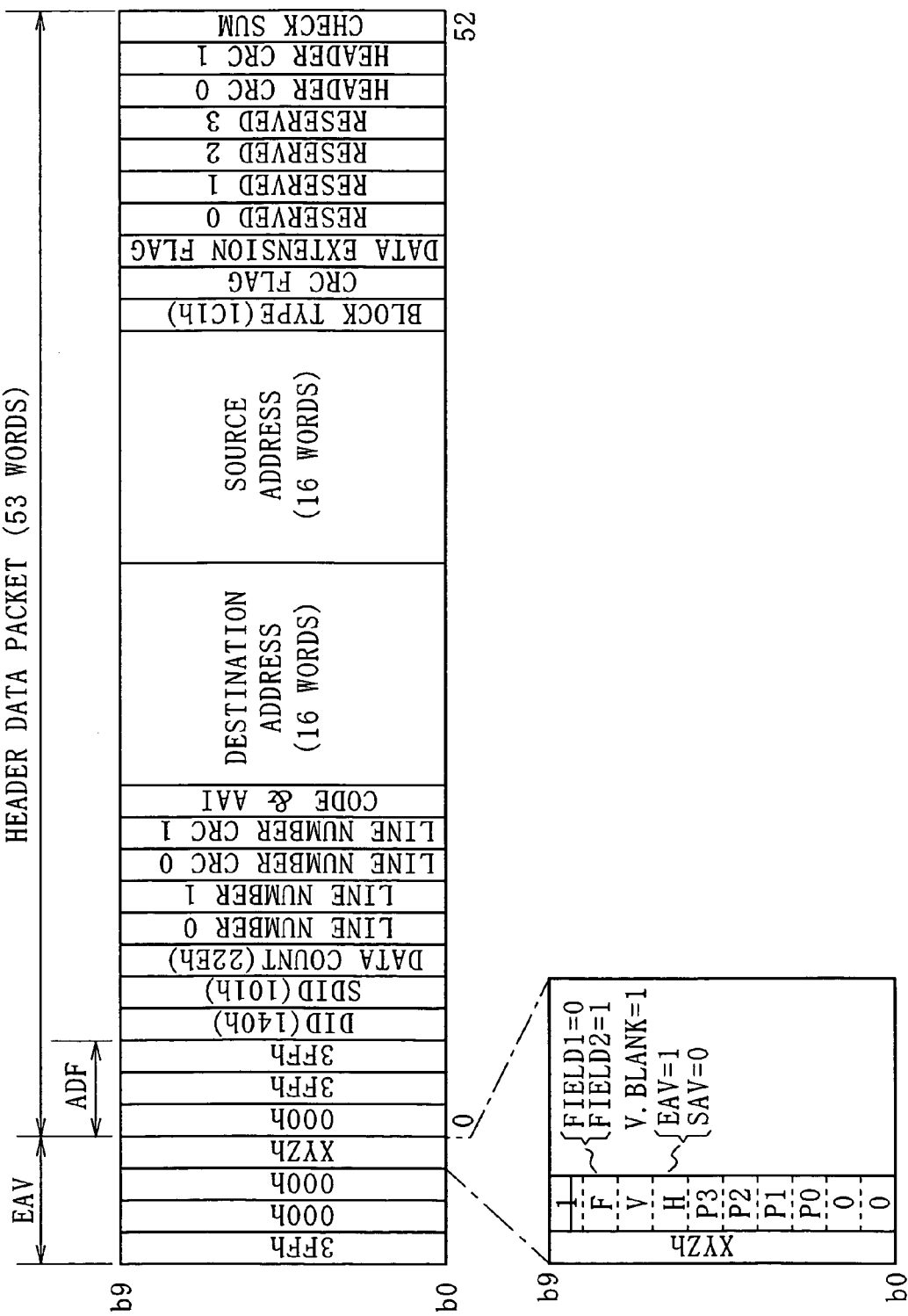
FIG. 2 is a diagram showing formats of EAV and header data.

An embodiment according to this invention will hereinafter be described with reference to the drawings. In this embodiment, items (e.g. picture item (Picture Item) and audio items (Audio Item) may be generated by packaging data such as video and audio materials or the like, and one item (system item (System Item)) may be generated by packaging information concerning respective items, metadata or the like. Then, these items may be packaged. The packaged item will be referred to as a content package. Further, transmission packets may be generated from this content package and may be transmitted by using an SDTI (serial digital transfer interface) standardized according to the SMPTE 305M (Society of Motion Picture and Television Engineers 305M).

In this SDTI, a variety of header information may be inserted into ancillary areas of transmission packets of the SDI format standardized according to the SMPTE 259M. The SDI format will be described next.

According to the SDI format, when located in one frame of video data, the NTSC525 system digital video signal may comprise 1716 (4+268+4+1440) words per line in the horizontal direction and 525 lines in the vertical direction. Also, the PAL625 system digital video signal may comprise 1728 (4+280+4+1440) words per line in the horizontal direction and 625 lines in the vertical direction where 10 bits/word may be satisfied.

With respect to each line, 4 words from the first word to the fourth word may be used as an area for storing therein a code EAV (End of Active Video) for indicating the end of the 1440-word active video area serving as a video signal area and which may be used to separate the active video area and an ancillary data area which will be described later on.

Also, with respect to each line, 268 words from the fifth word to the 172th word may be used as the ancillary data area in which there may be used header information, or the like. 4 word from the 273th word to the 276th word may be used as an area for storing therein a code SAV (Start of Active Video) for indicating the start of the active video area and which may be used to separate the active video area and the ancillary data area. Words following the 277th word may be used as the active video area.

Digital video signals of a D1 signal and a D2 signal may be inserted into this active video area. According to the SDTI format, in order that not only the D1 signal and the D2 signal but also a variety of data such as compressed video data and computer data can be inserted into the active video area of the above-mentioned SDI format, there may be provided a payload area in the same area as that of the active video area.

Further, according to the SDTI format, the ancillary data area may have a header data area into which a variety of header data may be inserted. The details of the header data area will be described later on.

The SDTI-CP format according to this invention might be such one that a variety of above-mentioned items may be inserted into the payload area of the SDTI format.

FIG. 1 shows an example in which the SDTI-CP format may be located in the video frame. As shown in FIG. 1, a system item, a picture item, an audio item and an auxiliary item (auxiliary item) may be located in the payload area, in that order. Incidentally, in FIG. 1, numerals within the parentheses may represent numerical values of the PAL626 system video signal, and numerals without parentheses may represent numerical values of the NTSC525 system video signal. Only the NTSC system will be described below.

The arrangement of the end synchronizing code EAV will be described with reference to FIG. 2. This code EAV may comprise 3FFh, 000h, 000h, XYZh (h may represent a hexadecimal notation, which may apply for the following description as well).

In "XYZh", a bit b9 may be set to "1", and bits b0, b1 may be set to "0". A bit b8 may be a flag indicating whether the field is the first field or the second field. A bit b7 may be a flag indicating a vertical blanking period. Also, a bit b6 may be a flag indicating whether the 4-word data is the EAV or the SAV. The flag of this bit b6 may be held at "1" if the 4-word data is the EAV, and may be held at "0" if the 4-word data is the SAV. Also, bits b5 to b2 may be data which may be used to error-detect and error-correct data.

Next, the arrangement of the header data (Header Data) contained in the ancillary data area is similarly illustrated in FIG. 2. As the leading portion of the header data, there may be located fixed patterns 000h, 3FFh, 3FFh as data "ADF (Ancillary data flag)" which may be used to recognize header data. These fixed patterns may be followed by "DID (Data ID)" and "SDID (Secondary data ID)". The DID and the SDID may indicate n attribute of an ancillary data portion. In the DID and the SDID, there may be located fixed patterns 140h, 101h which may represent that this attribute is a user application.

"Data Count" may represent the number of words ranging from "Line Number-0" to "Header CRC1". The number of words may be set to 46 words (22Eh).

"Line Number-0, Line Number-1" may represent the line number of video frame. According to the NTSC525 system, the line numbers from 1 to 525 may be expressed by these two words. Also, according to the PAL system 625 system, the line numbers from 1 to 625 may be expressed by these two words.

"Line Number-0, Line Number-1" may be followed by "Line Number CRC0, Line Number CRC1". The "Line Number CRC0, Line Number CRC1" may represent CRCs (cyclic redundancy check codes) which may be used to check a transmission error of data of 5 words ranging from "DID" to "Line Number-1".

"Code & AAI (Authorized address identifier)" may represent information which may indicate the word length of the payload area from the SAV to the EAV and the data format of addresses of the transmission side and the reception side, or the like.

"Destination Address" may be an address of a data receiving side (destination), and "Source Address" mat be an address of a data transmitting side (source).

"Block Type" which follows "Source Address" may indicate the system of the payload area, e.g. whether the payload area is of the fixed-length system or the variable-length system. Compressed data may be inserted into the block type if the payload area is of the variable-length system. Here, according to the SDTI-CP format, each item may be a variable-length block (Variable Block). Therefore, "Block Type" in the SDTI-CP format may be set to fixed-data 1C1h.

"CRC Flag" may be used to indicate whether or not CRCs may be located in the last 2 words of the payload area.

Also, "Data extension flag" which follows "CRC Flag" may indicate whether or not a user data packet is extended.

The "Data extension flag" mat be followed by "Reserved" area of 4 words. The next "Header CRC 0, Header CRC 1" may be CRCs (cyclic redundancy check codes) for data ranging from the "Code & AAI" to "Reserved4", and may be used to check a transmission error. The next "Check Sum" may be Check Sum code for all header data, and may be used to check a transmission error.

Figure 3:
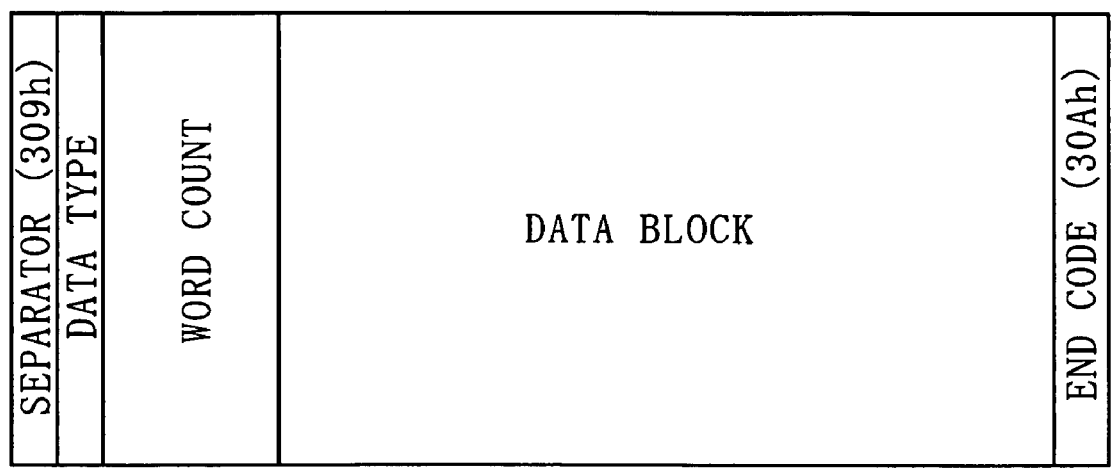
FIG. 3 is a diagram showing a format of a variable-length block.

Also, in the payload area of FIG. 1, data of items such as video and audio sources may be packaged as the system of the variable-length block of the SDTI format. FIG. 3 shows the format of the variable-length block. "Separator" and "End Code" may represent the start and the end of the variable-length block. A value of "Separator" may be set to "309h", and a value of "End Code" may be set to "30Ah".

Besides, according to the SDTI format, a fixed-length block may be defined. Incidentally, according to the SDTI-CP format, respective items may be inserted in the form of the variable-length block of the SDTI format.

"Data Type" may represent the kind of data which are inserted into the data block area, and may represent the kind of respective items which are inserted into the data block area according to the SDTI-CP format.

For example, the system item (System Item) may be set to "04h", the picture item (Picture Item) may be set to "05h", the audio item (Audio Item) may be set to "06h", and the AUX item (Auxiliary Item) which is other data may be set to "07h". Incidentally, as described above, when 1 word may be formed of 10 bits and which may be 8 bits as shown by "04h", for example, 8 bits may be equivalent to bits b7 to b0. Also, data of 10 bits may be obtained by adding even-numbered parity of bits b7 to b0 as a bit b8 and by adding logically-inverted data of bit b8 as a bit b9. Data of 8 bits, which will be described below, may be formed as data of 10 bits similarly.

"Word Count" may represent the number of words in the "Data Block". This "Data Block" may be data of each item. Data of respective items may be packaged at the picture unit, e.g. frame unit. Also, Since a program switching position may be set to the position of 10 lines according to the NTSC system, the system item, the picture item, the audio item and the AUX item will be transmitted from the 13th line in accordance with the NTSC system, in that order, as shown in FIG. 1.

Figure 4:
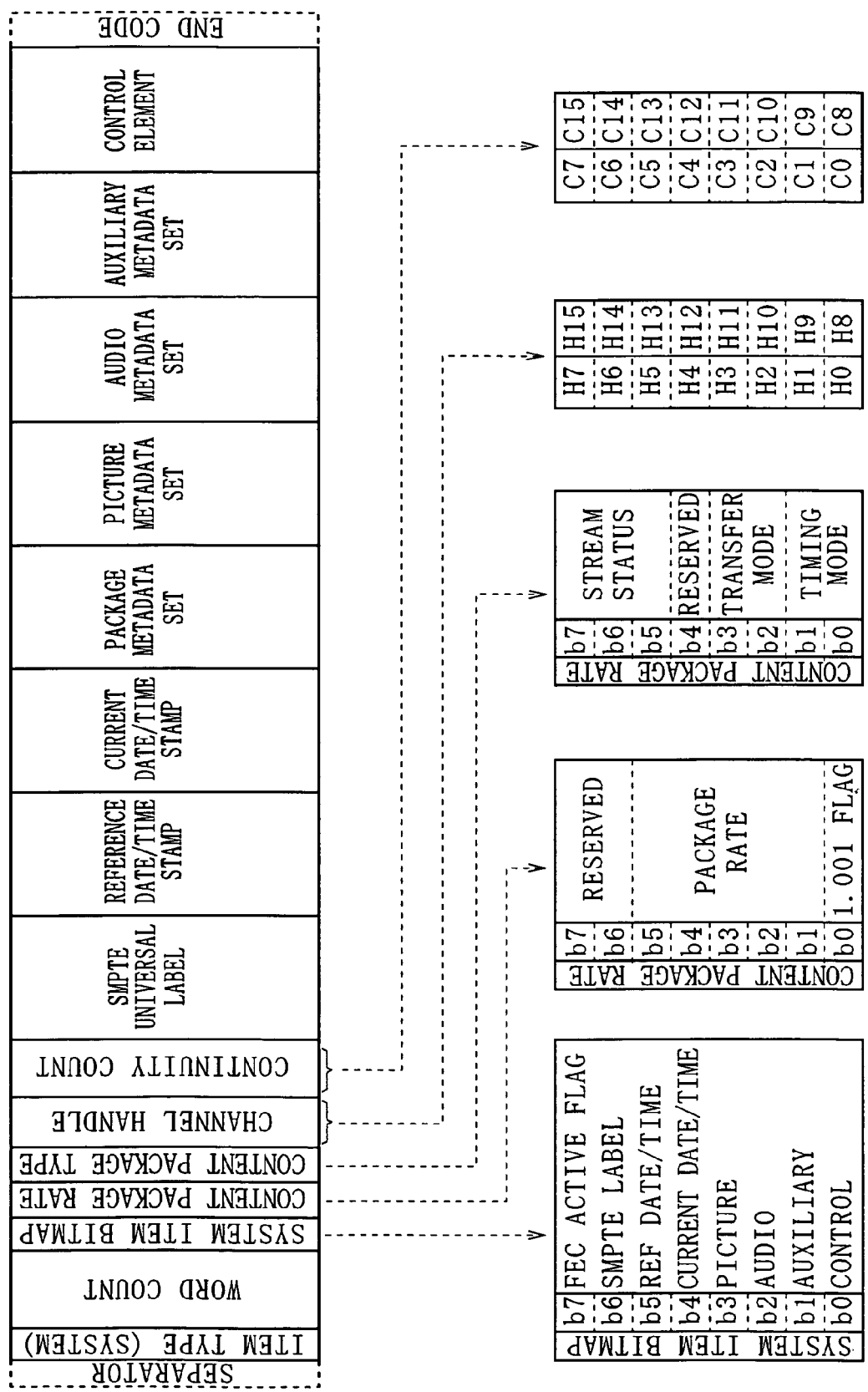
FIG. 4 is a diagram of a system item.

FIG. 4 shows the arrangement of the system item. This system item may be inserted into the payload area of the SDTI format. This system item may be generally comprised of "Separator", "Item Type", "Word Count" which may be the leading portion of the payload area, and "System Item Bitmap", "Content Package Rate", "Content Package Type", "Channel Handle", "Continuity Count", "SMPTE Universal Label", "Reference Data/Time Stamp", "Current Data/Time Stamp", "Package Metadata Set", "Audio Metadata Set", "Auxiliary Metadata Set" and "Control Element". Further, an end code defined by the SDTI format may be inserted into the system item.

A bit b7 of 1 word of "System Item Bitmap" may be a flag indicating whether or not an error-detecting and error-correcting code such as Reed Solomon code is added to the system item. If this flag is held at "1", then it may be indicated that the error-detecting and error-correcting code is added to the system item. A bit b6 may be a flag indicating whether or not the system item contains SMPTE Label information. If this flag is held at "1", then it may be indicated that the SMPTE Label information is contained in the system item. Bits b5 and b4 may be a flag indicating whether or not the system item contains Reference Date/Time stamp and Current Date/Time stamp. This Reference Date/Time stamp may indicate a time or a date at which the content package, for example, was made first. Also, the Current Date/Time stamp may indicate a time or a date at which the content package was amended last.

A bit bit 3 may be a flag which may indicate whether or not the picture item follows the system item. A bit b2 may be a flag which indicates whether or not the audio item follows the system item. A bit b1 may be a flag which indicates whether or not the AUX item follows the system item. If these flags are held at "1", then it may be indicated that these items may follow the system item.

A bit b0 may be a flag which indicates whether or no the system item contains a control element (Control Element). When this flag is held at "1", then it may be indicated that the system item contains the control element. Although not shown, bits b8, b9 may be added to the system item as described above, and the system item may be transmitted as 10-bit data.

Bits b7 to b6 of "Content Package Type" of one word may be "Stream States" flag which is used to discriminate the corresponding picture unit within the stream. This 3-bit flag may show the following 8 kinds of states:

0: This picture unit does not belong to any one of a pre-roll (pre-roll) interval, an editing interval and a post-roll (post-roll) interval.

1: This picture unit may be a picture contained in the pre-roll interval and may be followed by the editing interval.

2. This picture unit may be the first picture unit of the editing interval.

3. This picture unit may be a picture unit contained at the intermediate portion of the editing interval.

4. This picture unit may be the last picture unit of the editing interval.

5. This picture unit may be the picture unit contained in the post-roll interval.

6. This picture unit may be the first and last picture unit of the editing interval (state in which the editing interval may have only one picture unit).

7. Reserved.

A bit b4 may represent a reserved area (Reserved), and "Transfer Mode" of bits b3, b2 may represent a transmission mode of a transmission packet. "Timing Mode" of bits b1, b0 may represent a transmission timing mode in which the transmission packet is transmitted. If the value represented by the bits b3, b2 is held at "0", then the transmission mode may be set to a synchronous mode (Synchronous mode). When such value is held at "1", the transmission mode may be set to an isochronous mode (isochronous mode). When such value is held at "2", the transmission mode may be set to an asynchronous mode (Asynchronous mode). Also, when the value represented by the bits b1, b0 is held at "0", the transmission timing mode may be set to a normal timing mode (Normal timing mode) in which the transmission of content package of one frame is started at a timing of a predetermined line of the first field. When such value is held at "1", the transmission timing mode may be set to an advanced timing mode (Advanced timing mode) in which the transmission is started at a timing of a predetermined line of the second field. When such value is held at "2", the transmission timing mode may be set to a dual timing mode (Dual timing mode) in which the transmission is started at timings of predetermined lines of the first and second fields.

"Channel Handle" of 2 words following "Content Package Type" may be used to discriminate content packages of respective programs when content packages of a plurality of programs are multiplexed and then transmitted. The multiplexed content package can be separated at every program by discriminating the values of bits H15 to H0.

The "Continuity Count" of 2 words may be a 16-bit Modulo counter. This counter may count values at every picture unit in the ascending order, and also may independently count values at every stream. Accordingly, when the stream is switched by a stream switcher or the like, the value of this counter may become discontinuous, thereby making it possible to detect a switching point (editing point). Incidentally, since this counter may be the 16-bit modulo counter as described above and its count value may be extremely as large as 65536, there may be the endlessly lowest probability that the values of the counter will accidentally agree with each other at the switching point in the two switched streams. Therefore, it is possible to detect the switching point with a sufficiently high precision in actual practice.

The "Continuity Count" may be followed by "SMPTE Universal Label", "Reference Date/Time stamp", "Current Date/Time stamp" areas indicating the above-mentioned SMPTE Label, Reference Date/Time and Current Date/Time.

The above-mentioned areas may be followed by "Package Metadata Set", "Picture Metadata Set", "Audio Metadata Set" and "Auxiliary Metadata Set" areas. Incidentally, "Picture Metadata Set", "Audio Metadata Set" and "Auxiliary Metadata Set" may be provided when "System Item Bitmap" flag indicates that the corresponding items are contained in the content package.

The above-mentioned "Time Stamp" may comprise 17 bytes wherein the first one byte is used to identify "Time stamp" and the remaining 16 bytes are used as the data area. The first 8 bytes of the data area may represent a time code (Timecode) standardized as SMPTE12M, for example, and the remaining 8 bytes may be invalid data.

Figure 5:
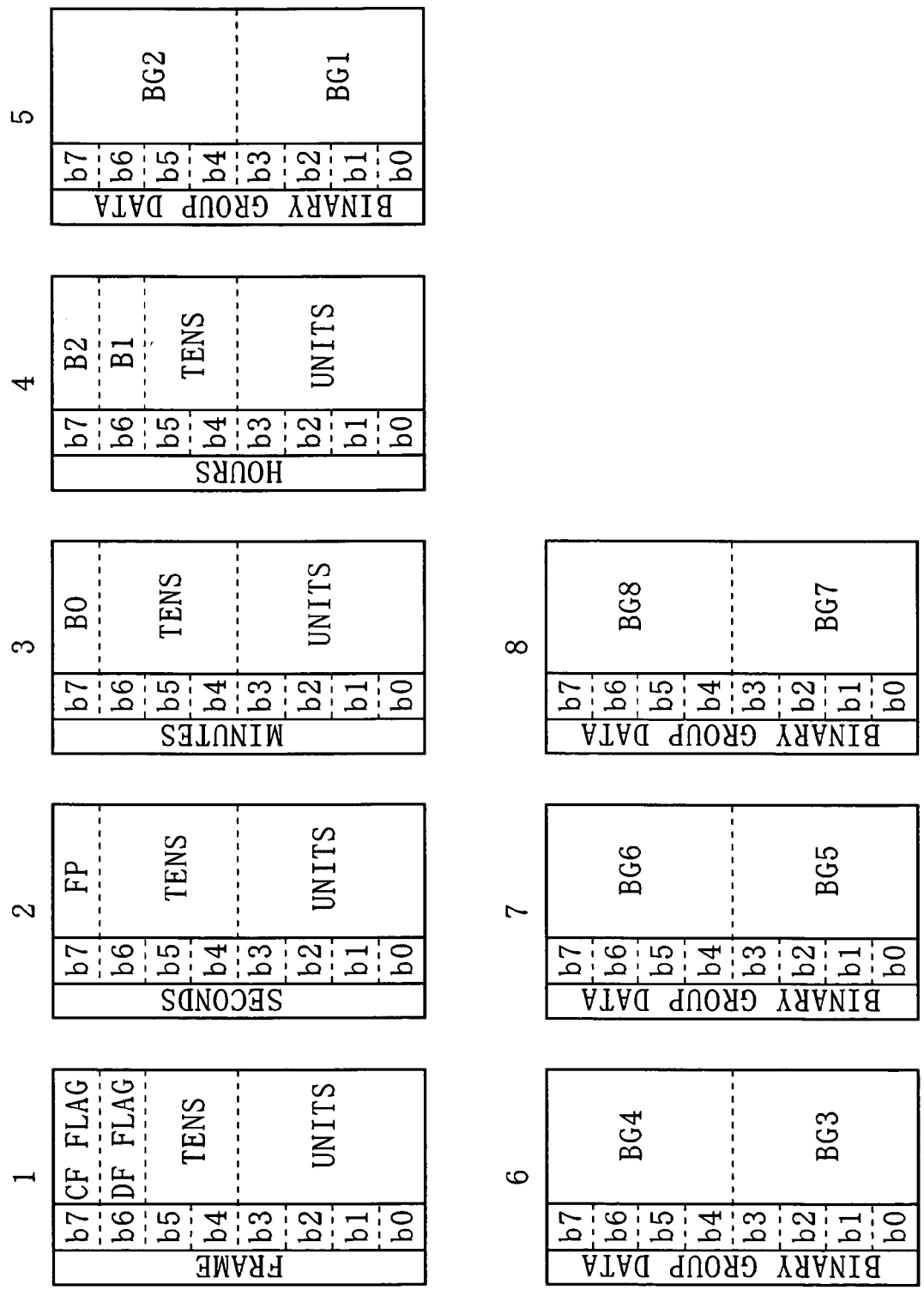
FIG. 5 is a diagram of a time code.

The 8-byte time code may comprise "Frame", "Seconds", "Minutes", "Hours" and 4-byte "Binary Croup Data" as shown in FIG. 5.

Bits b5, b4 of "Frame" may represent the value of the second digit of the frame number, and bits b3 to b0 may represent the value of the first digit of the frame number. In a like manner, respective bits b6 to b0 of "Seconds", "Minutes", "Hours" mat represent a second, a minute and an hour.

A bit b7 of "Frame" may be a color frame flag (Color Frame Flag) and may indicate whether the color frame is the first color frame or the second color frame. A bit b6 may be a drop frame flag (Drop Frame Flag) and may indicate whether or not the video frame inserted into the picture item is the drop frame. A bit b7 of "Seconds" may represent the field phase (Field Phase), i.e. whether the field is the first field or the second field when the digital video signal is the NTSC system digital video signal, for example. Incidentally, when the digital video signal is the PAL system digital video signal, a bit b6 of "Hours" may represent the field phase.

A bit b7 of "Minutes" and 3 bits B0 to B3 of bits b7, b6 of "Hours" (3 bits of respective bits b7 of "Seconds", "Minutes", "Hours" in the case of the PAL system) may represent whether each of BG1 to BG8 of "Binary Group Data" contains data. This "Binary Group Data" may be able to express a date of Gregorian Calendar (Gregorian Calender) and Julian Calendar (Julian Calender) in the form of two digits.

FIG. 6 shows the arrangement of "Metadata Set". "Metadata Count" of one word may represent the number of "Metadata Block" within the set. Incidentally, when the value of "Metadata Set" is 00h, this may indicate the absence of "Metadata Block". Thus, "Metadata Set" may become one word.

When "Metadata Block" may be "Package Metadata Set" indicating content package information such as a program title, "Metadata Type" of 1 word and "Word Count" of 2 words may be followed by "Metadata" which may be the information area. The number of words of "Metadata" may be represented by bits b15 to b0 of "Word Count".

"Picture Metadata Set", "Audio Metadata Set" and "Auxiliary Metadata Set" indicating information concerning packaged items such as video and audio data and AUX data may further contain "Element Type" and "Element Number" of one word and may be linked to "Element Type" and "Element Number" within "Element Data Block" of items such as video and audio data, which will be described later on, thereby making it possible to set metadata at every "Element Data Block". Also, these "Metadata Set" may be followed by "Control Element" area.

Figure 7:
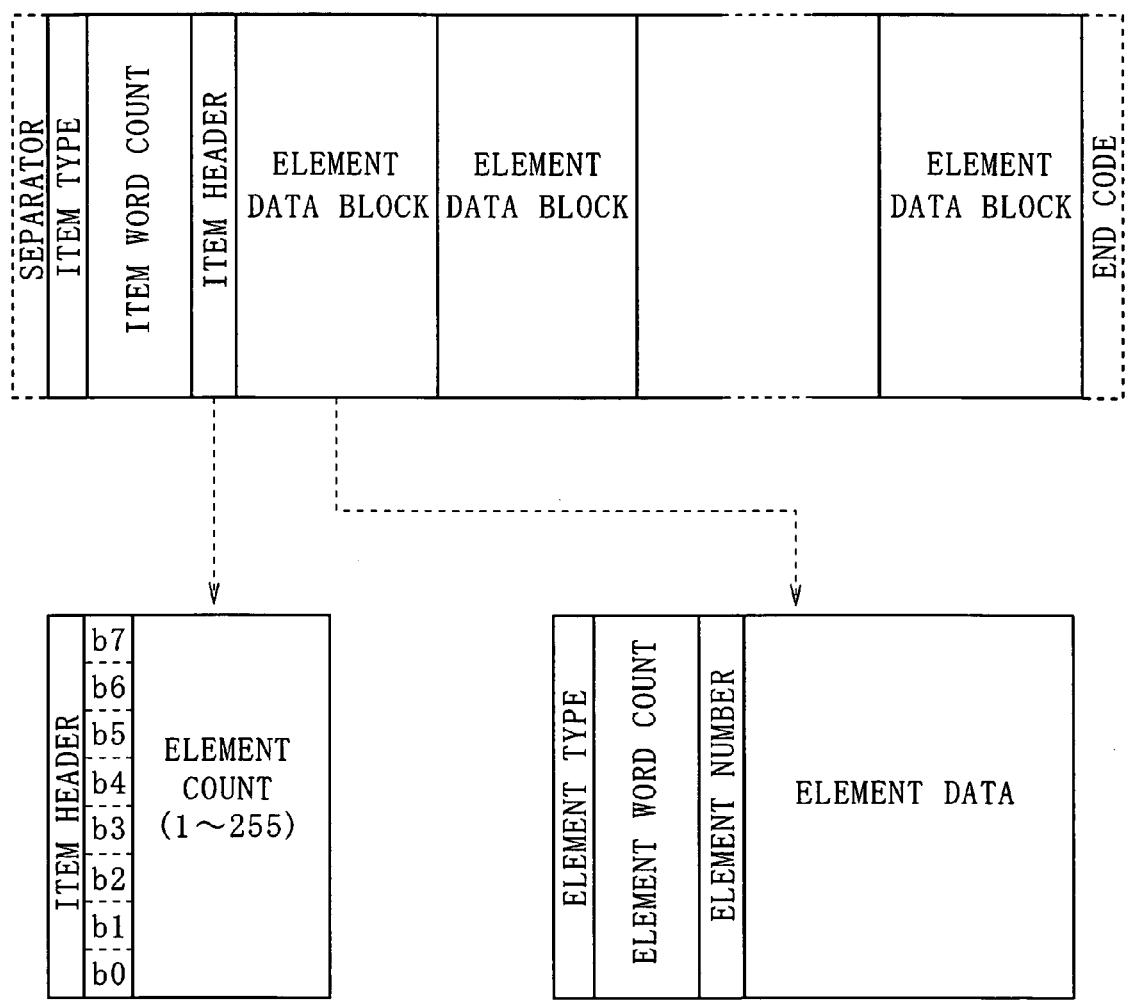
FIG. 7 is a diagram of items except the system item.

Next, blocks of respective items such as video and audio data will be described with reference to FIG. 7. Each item block "Item Type" such as video and audio data (equivalent to data type of SDTI format) may represent the kind of items as described above. The picture item may be set to "05h", the audio item may be set to "06h" and the AUX data item may be set to "07h". "Item Word Count" may represent the number of words up to the end of this block (equivalent to "Word Count" of SDTI format). "Item Header" which follows "Item Word Count" may represent the number of "Element Data Block". Here, since "Item Header" is formed of 8 bits, the number of "Element Data Block" may fall within a range of from 1 to 255 (0 is invalid). The "Element Data Block" which follows this "Item Header" may be the item data area.

The "Element Data Block" may comprise "Element Type", "Element Word Count", "Element Number" and "Element Data". The "Element Type" and the "Element Word Count" may represent the kinds of data of "Element Data" and the data quantity. Also, the "Element Number" may represent the sequential order of "Element Data Block".

Figure 8:
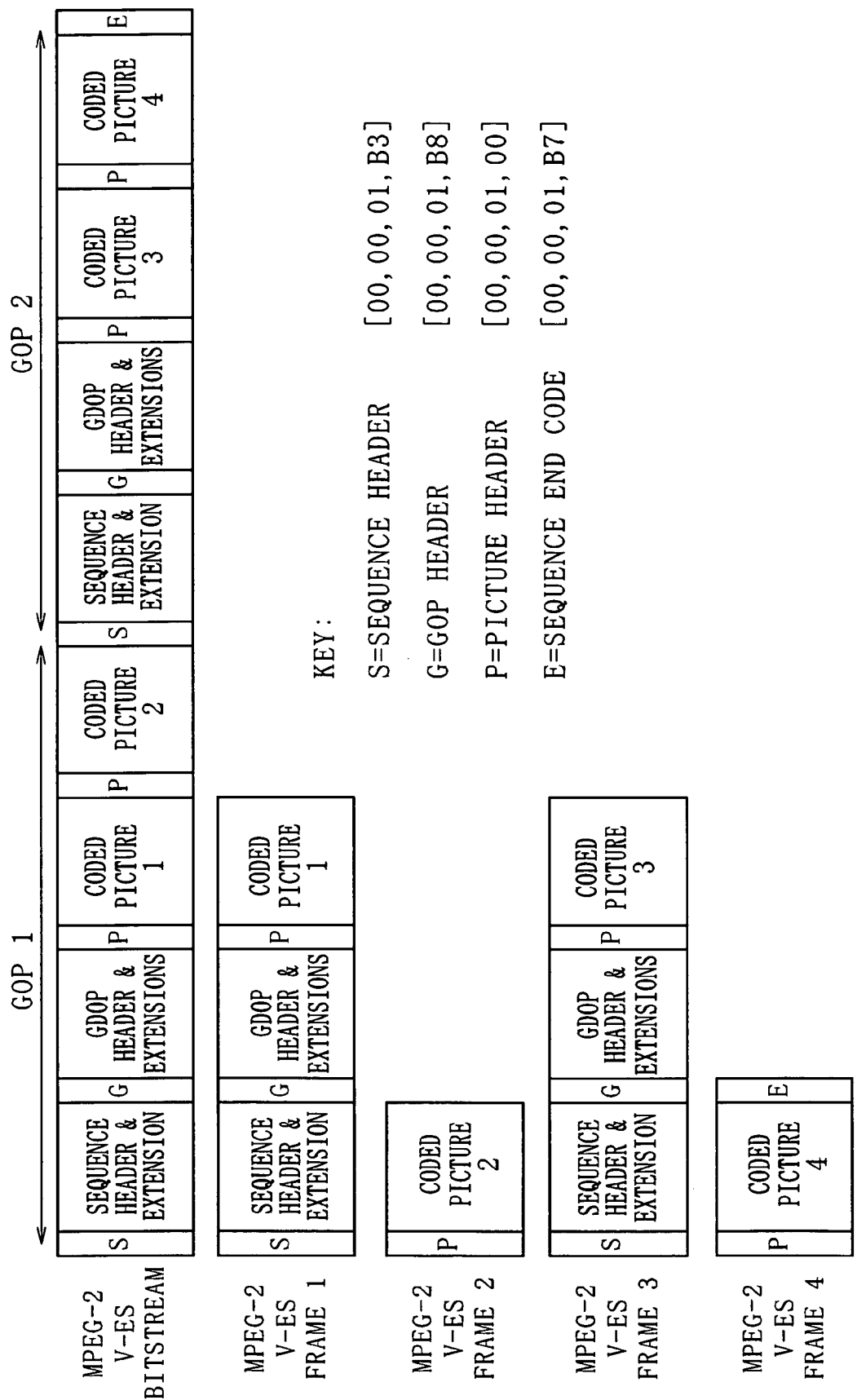
FIG. 8 is a diagram of an SDTI-CP frame element.

The arrangement of "Element Data" will be described next. MPEG-2 picture element which is one of elements may be MPEG-2 video elementary stream (V-ES) of any of the profile or the level. The profile and the level may be defined by a decoder template document. FIG. 8 shows an example of the format of MPEG-2 V-ES in the SDTI-CP element frame. This example may be the V-ES bit stream example which may specify the key, i.e. MPEG-2 start code (according to the SMPTE recommended practice). The MPEG-2 V-ES bit stream may be formatted to the data block as shown simply in FIG. 8.

Metadata relative to the picture item, e.g. MPEG-2 picture image editing metadata will be described next. This metadata may be a combination of editing and error metadata, compression-coded metadata and source-coded metadata. These metadata can be mainly inserted into the above-mentioned system item and further may be inserted into the auxiliary data item.

FIG. 9 shows "Picture Editing Bitmap" area, "Picture Coding" area and "MPEG User Bitmap" area provided within the MPEG-2 picture editing metadata which may be inserted into "Picture Metadata Set" of the system item shown in FIG. 4. Further, it can be considered that this MPEG-2 picture editing metadata may contain "Profile/Level" indicating the profile and the level of MPEG-2 and video index information defined by an SMPTE186-1995.

Bits b7 and b6 of "Picture Editing Bitmap" of 1 word may be "Edit flag" and may be flags indicative of editing point information. This 2-bit flag may show the following four kinds of states:

00: Editing may not be available.

01: Editing point may be located ahead of the picture unit with this flag attached thereto.

10: Editing point may be located behind the picture unit with this flag attached thereto.

11: Only one picture unit may be inserted and editing points may be located ahead of and behind the picture unit with this flag attached thereto (single frame picture).

That is, the flag which may indicate whether the video data (picture unit) inserted into the picture item may be located ahead of the editing point, may be located behind the editing point or may be sandwiched between the two editing points may be inserted into the "Picture Editing Bitmap" of "Picture Metadata Set" (see FIG. 4).

The bits b5 and b4 may be "Error flag". The Error flag" may represent whether the picture contains an error that cannot be corrected, whether the picture contains a conceal error, whether the picture does not contain an error and further whether the picture is placed in the unknown state. The bit b3 may be a flag indicating whether "Picture Coding" is contained in this "Picture Metadata Set" area. If this flag is held at "1", then this flag may indicate that "Picture Coding" is contained in the above-mentioned area.

The bit b2 may be a flag which indicates whether or not the metadata block contains "Profile/Level". If this flag is held at "1", then it is determined that the "Metadata Block" contains "Profile/Level". This "Profile/Level" may represent MP@ML and HP@HL, or the like which may indicate the profile and level of MPEG.

The bit b1 may be a flag which indicates whether or not the metadata block contains "HV Size". If this flag is held at "1", then it is determined that the "Metadata Block" contains the "HV Size". The bit b0 may be a flag which indicates whether or not the metadata block contains "MPEG User Bitmap". If this flag is held at "1", then it is determined that the "Metadata block" contains the "MPEG User Bitmap".

The bit b7 of "Picture Coding" of one word may contain "Closed GOP". This "Closed GOP" may indicate whether or not MPEG-compressed GOP is the Closed GOP.

The bit b6 may contain "Broken Link". This "Broken Link" may be a flag which may be used to control the reproduction on the decoder side. That is, although the respective MPEG pictures are arranged in the sequential order of B picture, B picture, I picture . . . , if pictures of a quite different stream are connected to the above-mentioned picture due to the editing point, there is then the risk that the B picture of the switched stream, for example, will be decoded with reference to the P picture of the previous stream. If this flag is set, then it becomes possible to prevent the decoder side from executing the above-mentioned decoding.

The bits b5 to b3 may be assigned to "Picture Coding Type". This "Picture Coding Type" may be a flag which determines whether the picture is the I picture, the B picture or the P picture. The bits b2 to b0 may be assigned to the reserved area (Reserved).

The bit b7 of "MPEG User Bitmap" of one word may be assigned to "History data". This "History data" may be a flag which indicates whether or not encoded data such as quantization step, macro type and motion vector, which are required in the encoding of the preceding generation is inserted into a user data area existing within "Metadata" of "Metadata Block", for example, as History data. The bit b6 may be assigned to "Anc data". This "Anc data" may be a flag which determines whether or not data inserted into the ancillary area (data necessary for MPEG compression, etc.) is inserted into the above-mentioned user data area as Anc data.

The bit b5 may be assigned to "Video Index". This "Video Index" may be a flag which determines whether or not Video index information is inserted into the Video index area. This Video index information may be inserted into a 15-byte Video index area. In this case, the positions at which video index information may be inserted into the video index area may be determined in response to 5 classes (classes of 1.1, 1.2, 1.3.1.4 and 1.5). Video index information of 1.1 class, for example, may be inserted into the first 3 bytes.

The bit b4 may be assigned to "Picture order". This "Picture order" may be a flag which determines whether or not the sequential order of respective pictures in the MPEG stream was changed. Incidentally, the sequential order of respective pictures in the MPEG stream should be changed when data are multiplexed.

The bits b3, b2 may be assigned to "Timecode2", "Timecode1". The "Timecode2", "Timecode1" may be flags which determine whether or not VITC (Vertical Interval Time Code), LTC (Longitudinal Time Code) are inserted into the areas of Timecode2, 1.The bits b1, b0 may be assigned to "H-Phase", "V-Phase". The "H-Phase", "V-Phase" may be flags that determine which horizontal pixel and which vertical line data are encoded upon encoding, i.e. whether or not information of the actual frame exists within the user data area.

Figure 10:
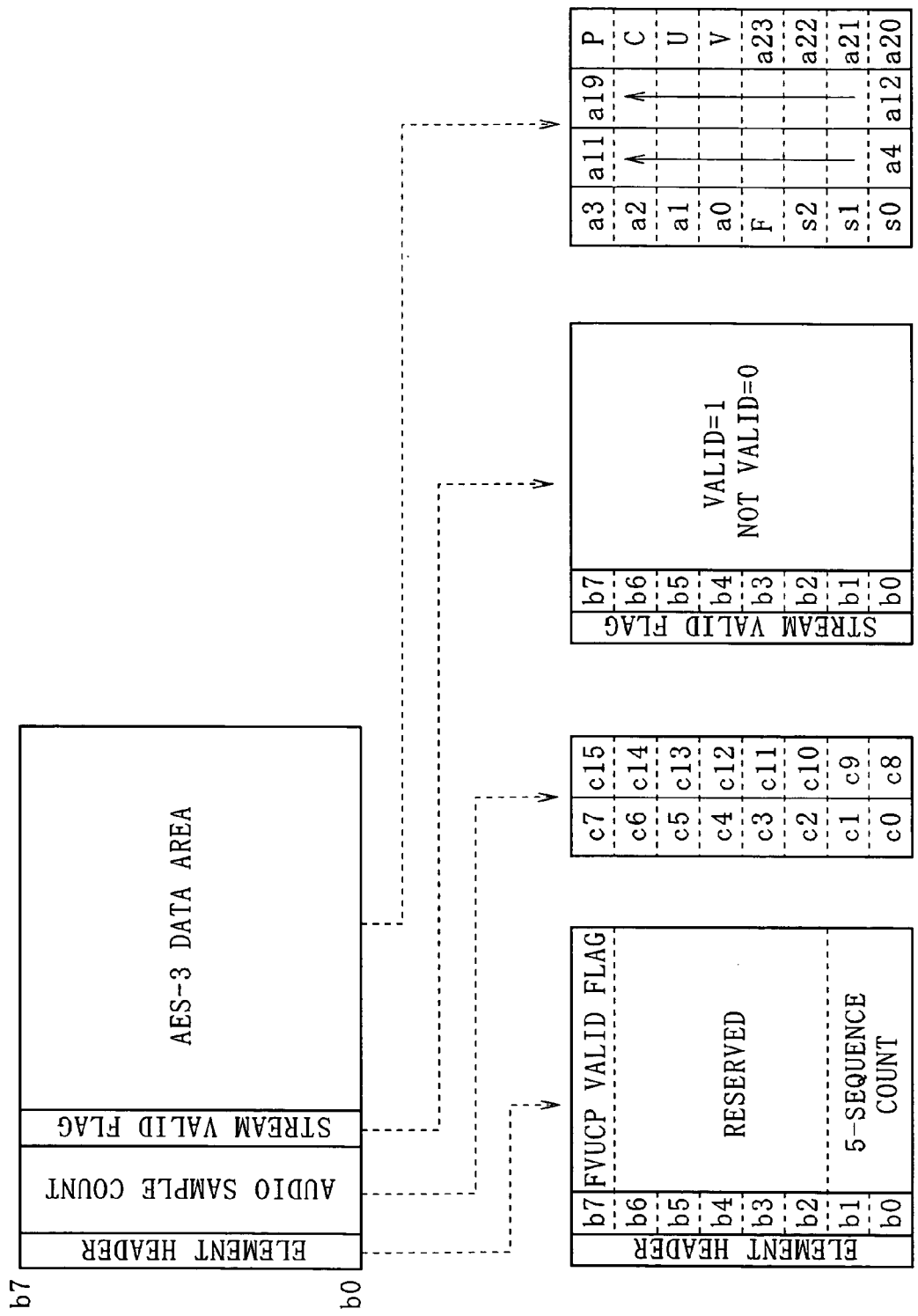
FIG. 10 is a diagram of an element data block of audio item.

The audio item will be described next. "Element Data" of the audio item may comprise "Element Header", "Audio Stamp Count", "Stream Valid Flags" and "Data Area" as shown in FIG. 10.

The bit b7 of the "Element Header" of one word may be "FVUCP Valid Flag" which determines whether or not FVUCP defined in the AESA^3 format standardized by AES (Audio Engineering Society) is set by audio data (audio data) of the AES-3 format of "Data Area". The bits b2 to b0 may represent the sequence number of 5-frame sequence (5-sequence counter).

Here, the 5-frame sequence will be described. When an audio signal synchronized with a video signal of (30/1.001) frames/second in the 525 scanning lines comprising one frame and whose sampling frequency is 48 kHz is divided at every block of each frame, the number of samples per video frame becomes 1601.6 samples/frame and does not become an integral value. For this reason, the sequence in which there are provided 2 frames of one frame comprising 1601 samples and 3 frames of one frame comprising 1602 samples so that 8008 samples may comprise 5 frames is what might be called the 5-frame sequence.

Figures 11A, 11B:
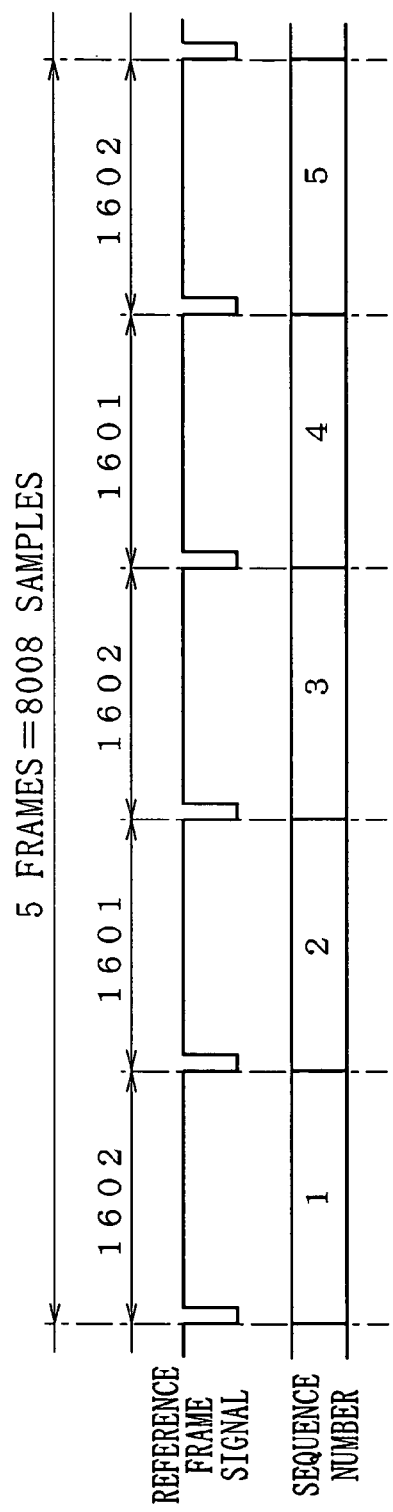
FIG. 11 is a timing chart showing a 5-frame sequence.

In the 5-frame sequence, in synchronism with a reference frame signal shown in FIG. 11A, the frames of the sequence numbers 1, 3, 5 may comprise 1602 samples and the frames of the sequence numbers 2, 4 may comprise 1601 samples as shown in FIG. 11B, for example. This sequence number may be represented by the bits b2 to b0.

The "Audio Sample Count" of 2 words may be a 16-bit counter using bits c15 to c0 falling within a range of from 0 to 65535 as shown in FIG. 10 and may represent the number of samples of each channel. Incidentally, within the element, all channels may have the same value.

The "Stream Valid Flags" of one word may represent whether or not each stream of 8 channels is valid. If the channel contains significant audio data, then a bit corresponding to this channel is set to "1". In other cases, the above bit is set to "0", and only the audio data of the channel in which the bit was set to "1" may be transmitted.

Bits "s2 to s0" of the "Data Area" may represent the data area which is used to discriminate each stream of 8 channels. A bit "F" may represent the start of subframe. Bits "a23 to a0" may represent audio data, bits "P, C, U, V" may represent channel status bit, user bit, validity bit, parity, or the like.

Figure 12:
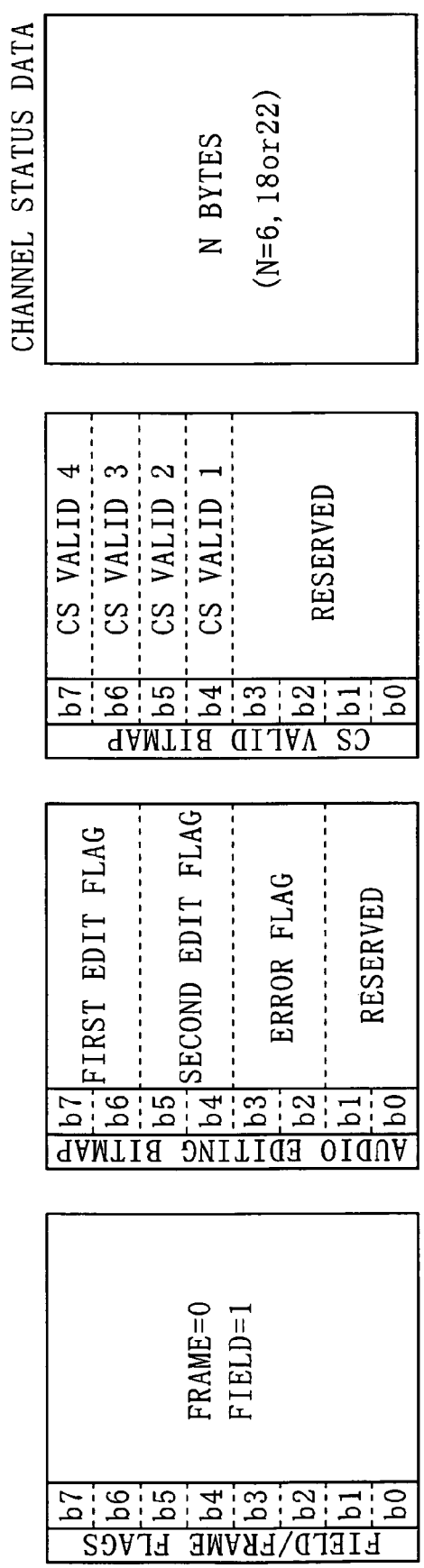
FIG. 12 is a diagram of audio editing metadata.

Next, metadata for the audio item will be described. Audio editing metadata (Audio Editing Metadata) may be a combination of editing metadata, error metadata and source coding metadata. This audio editing metadata may comprise "Field/Frame flags" of 1 word, "Audio Editing Bitmap" of 1 word, "CS Valid Bitmap" of 1 word and "Channel Status Data" as shown in FIG. 12.

Here, the number of valid audio channels can be discriminated by the above-mentioned "Stream Valid Flags" shown in FIG. 10. Also, if the flag of "Stream Valid Flags" is set to "1", then "Audio Editing Bitmap" may become valid.

A flag "First editing flag" of "Audio Editing Bitmap" may represent information concerning the editing situation in the first field and a flag "Second editing flag" may represent information concerning the editing situation in the second field, and may determine whether the editing point is located ahead of or behind the field with this flag attached thereto. A flag "Error flag" may determine whether or not errors that cannot be corrected occur.

"CS Valid Bitmap" may be the header of "Channel Status Data" of n (n=6, 14, 18 or 22) bytes, and may represent which one of 24 channel status words may exist within the data block. Here, a bit "CS Valid1" may be a flag which determines whether or not data exists in 0 to 5 bytes of "Channel Status Data". Bits "CS Valid2" to "CS Valid4" may be flags which determine whether or not data exists in 6 to 13 bytes, 14 to 17 bytes and 18 to 21 bytes of "Channel Status Data". Incidentally, "Channel Status Data" may be 24 bytes. The second 22-byte data from the end may determine whether or not data exists in 0 to 21 bytes, and the last 23-byte data may be assigned to CRC for 0 to 22 bytes. Also, the flag "Field/Frame flags" may determine whether data is packed in 8-channel audio data at any of the frame unit or the field unit.

A general data format (General Data Format) may be used to carry all free-form data type. However, this free-form data type may not contain a special auxiliary element type such as IT nature (word processing, hypertext, etc.).

The SDTI-CP format may be comprised of the above-mentioned data streams.

According to this invention, there are prescribed the data transfer mode and the data timing mode in order to realize a real time transmission within a constant time period. FIG. 13 shows a relationship between this transfer mode and the timing mode. The transfer mode may comprise a synchronous transfer mode (Synchronous Mode) for transferring information to the transmission side periodically and regularly, an asynchronous transfer mode (Asynchronous Mode) for transferring information randomly and an isochronous transfer mode (Isochronous Mode) for successively transferring data real time within a constant period of time, for example.

Also, the timing mode may comprise a normal timing mode (Normal Timing Mode) for transmitting transmission packets at a timing in which the first field of the video frame is transmitted, an advanced timing mode (Advanced Timing Mode) for transmitting transmission packets at a timing in which the second field of the video frame is transmitted and a dual timing mode (Dual Timing Mode) for transmitting transmission packets at a timing in which the first and second fields of the video frame are transmitted.

While FIG. 13 shows the relationship between the transfer mode and the timing mode, FIGS. 14A to 14D and FIGS. 15A to 15F show the layout in which transmission packets are located at every picture unit in the respective modes.

Figure 14A:
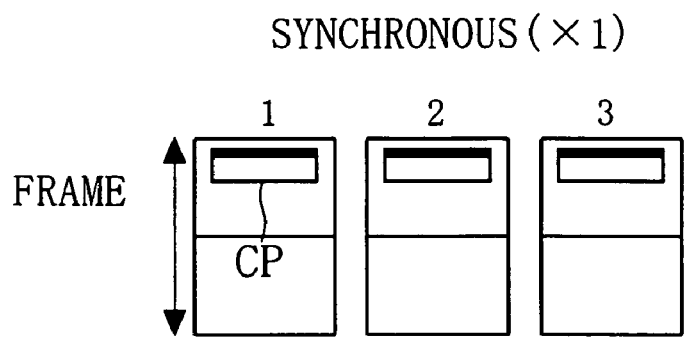

As shown in FIG. 14A, when the transfer mode is the synchronous mode and the timing mode is the normal timing mode, the transmission packet containing the content package (CP) may be located at and transferred from the first field of each frame at a standard speed one time normal speed. In FIG. 14A, a bar illustrated within the content package may represent the position at which the system item is located. This will apply for the following description as well.

Figure 14B:
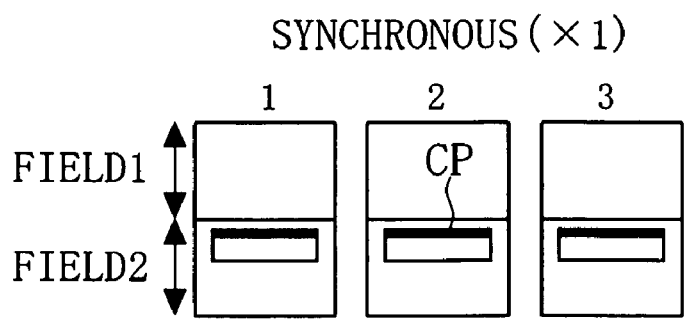

When the transfer mode is the synchronous mode and the timing mode is the advanced timing mode, the transmission packet containing the content package may be located at and transmitted from the second field of each frame as shown in FIG. 14B.

Figure 14C:
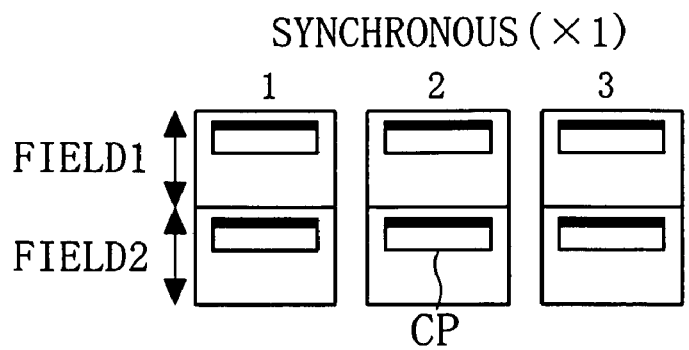

When the transfer mode is the synchronous mode and the timing mode is the dual timing mode, the transmission packets containing the content packages may be located at and transmitted from the first and second fields of each frame as shown in FIG. 14C.

In this dual timing mode, there may be transferred compressed video data of 525 lines/60 frames and compressed video data which was MPEG-compressed by the field coding.

In the normal timing mode, the transmission packet may be inserted from a predetermined line of the first field. In the 525 lines/60 fields, the system item may be inserted into the 13th line. In this connection, in the 625 lines/50 fields, the system item may be inserted into the 9th line.

In the advanced timing mode, the transmission packet may be inserted from the second field. In the 525 lines/60 fields, the system item may be inserted into the 276th line. In the 625 lines/50 frames, the system item may be inserted into the 323th line.

During the dual timing mode, in the 525 lines/60 frames, the system items may be inserted into the 13th line and the 276th line. In the 625 lines/50 frame, the system items may be inserted into the 9th line and the 322th line.

Figure 14D:
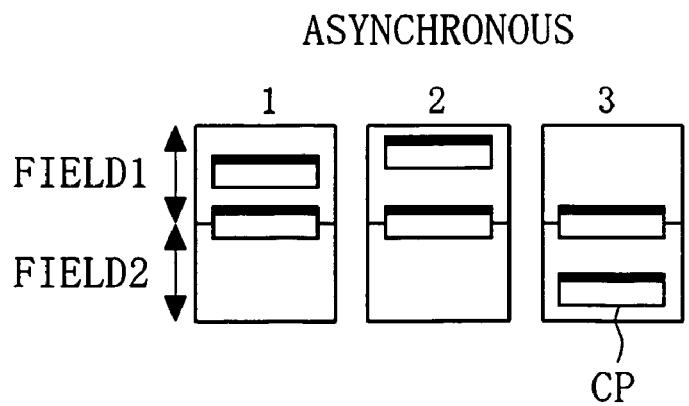

When the transfer mode is the a synchronous mode, as shown in FIG. 14D, the transmission packets containing the content packages may be located at and transmitted from arbitrary areas.

Figure 15A:
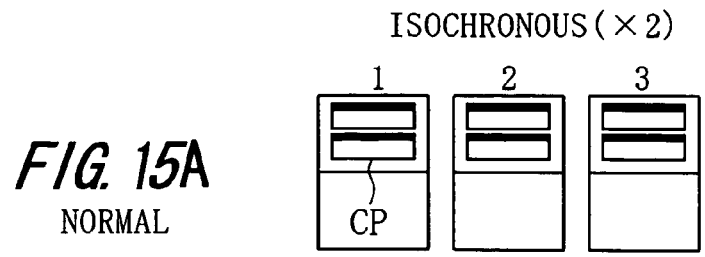
FIGS. 15A to 15F are diagrams showing a relationship among positions at which content package is inserted in an isochronous transfer mode and timing modes.
Figure 15B:
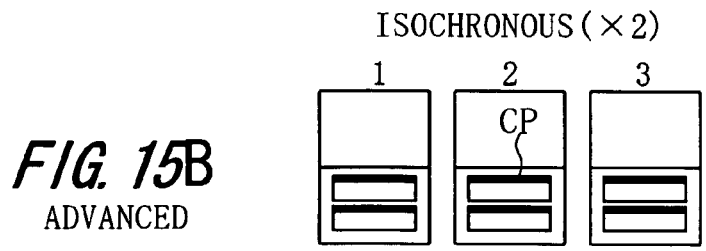
Figure 15C:
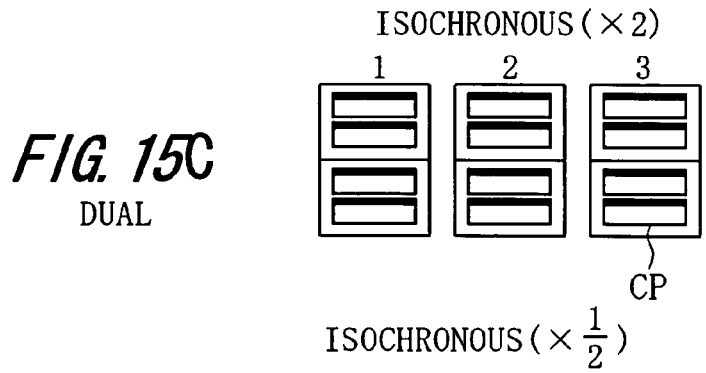

FIGS. 15A to 15C are diagrams to which reference will be made in explaining the manner in which the transmission packets are located and transmitted when the transfer mode is the asynchronous mode. FIG. 15A shows an example of the layout in which the transmission packets are located when the transfer mode is the isochronous mode and the timing mode is the normal timing mode. In this example, the transmission packet containing the content package (CP) may be located at and transmitted from the first field of each frame at a speed twice the normal speed.

When the transfer mode is the isochronous transfer mode and the timing mode is the advanced timing mode, the transmission packet containing the content package may be located at and transmitted from the area of the second field of each frame as shown in FIG. 15B.

When the transfer mode is the isochronous transfer mode and the timing mode is the dual timing mode, the transmission packets containing the content packages may be located at and transmitted from the areas of the first and second fields of each frame.

Figure 15D:
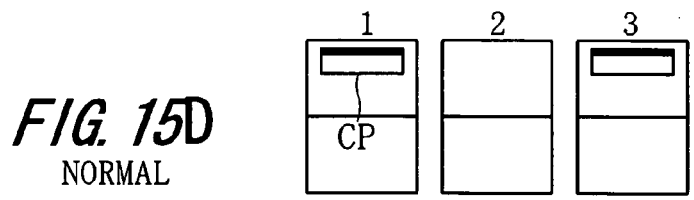
Figure 15E:
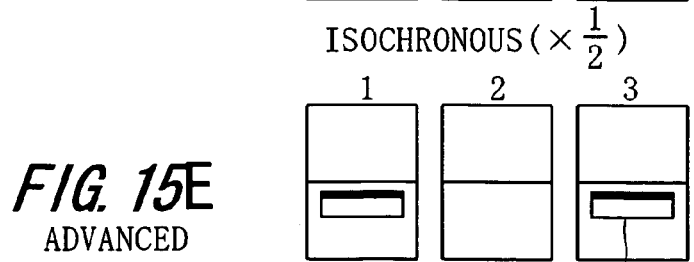
Figure 15F:
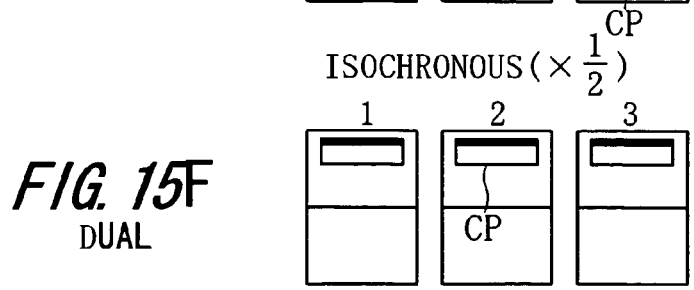

FIGS. 15D to 15F show examples of the layouts in which the transmission packets are located when the transmission speed is a 1/2 times as high as the normal speed. When the transfer mode is the isochronous mode and the timing mode is the normal timing mode, the transmission packets containing the content packages may be located at and transmitted from the first field of each frame as shown in FIG. 15D.

When the transfer mode is the isochronous transfer mode and the timing mode is the advanced timing mode, the transmission packets containing the content packages may be located at and transmitted from the second field of each frame as shown in FIG. 15E.

When the transfer mode is the isochronous transfer mode and the timing mode is the dual timing mode, the transmission packets containing the content packages may be located at and transmitted from the areas of the first and second fields of each frame as shown in FIG. 15E.

Lines into which the system items are inserted may be the same as those of the timing modes shown in FIGS. 14A to 14C.

Here, the quantity of data that can be transmitted within one frame may be 6.048 Mbits (=1440 bytes×8 bits×525 lines) at maximum. On the other hand, when video data is MPEG-compressed under the condition that each picture rate is the same, if an average compressing rate is 50 Mbps, then the data quantity may become 1.66 Mbits per frame. Therefore, it is possible to transmit data of the data quantity as large as 6.048 Mbits/1.66 Mbits=3.6 times. Thus, during the isochronous transfer mode, if data is at 50 Mbps, then it is possible to realize the high-speed transfer up to the three times the normal speed.

In order to discriminate the three transfer modes and the three timing modes, data indicative of the above-mentioned transfer modes may be inserted into the payload portions contained in the transmission packet prescribed by the SDTI format, at its content package type areas near the type areas (item type areas) indicating the kinds of data in the data block areas as shown in FIG. 4 by using the 2-bit data (b2, b3) and then transmitted.

Moreover, according to this invention, the data indicative of the above-mentioned timing modes may be inserted into the payload portions contained in the transmission packet prescribed by the SDTI format at its content package type areas near the type areas indicating the types of data of the data block area similarly as shown in FIG. 4 by using the 2-bit data (b0, b1).

Figure 16:
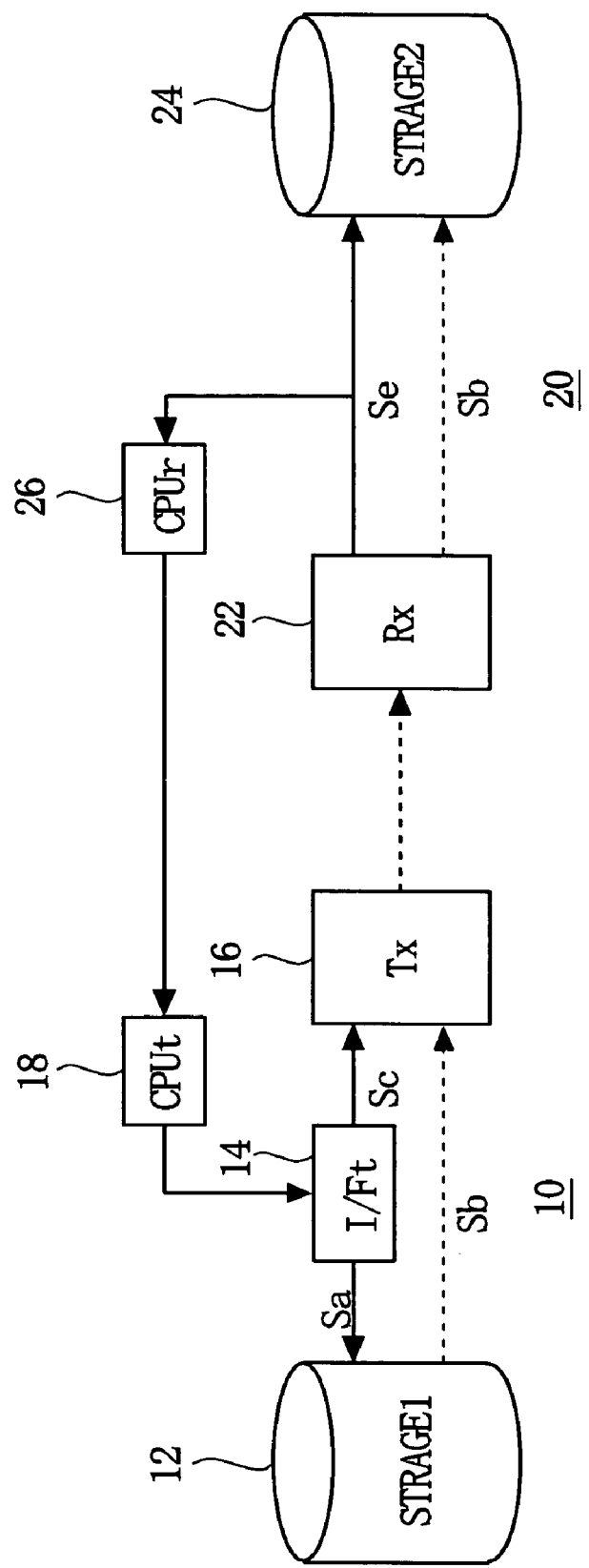
FIG. 16 is a block diagram showing an outline of a data transmission apparatus and to which reference will be made in explaining the asynchronous transfer mode.

The details of the transmission system which may transmit the above-mentioned transmission packet will be described next. The manner in which data is transmitted in the asynchronous transfer mode will be described first. FIG. 16 shows the outline of the data transmission system in the asynchronous transfer mode.

This data transmission system may comprise a transmitting system 10 and a receiving system 20. The transmitting system 10 may comprise a storage means (data storage section) 12 in which transmitted data are stored, an interface (I/Ft) 14 for issuing a data transfer request, a transmitting section (TX) 16 for transmitting read-out data and a control section (CPU) 18 for supplying transferred results to the interface 14.

As the storage means 12, there can be used a hard disk device (HDD device) which may be a recording medium that can be accessed in a nonlinear fashion, a semiconductor memory such as a D-RAM and a flash memory, a video tape recorder (VTR) for recording data on a tape-like magnetic field, or the like.

The interface 14 may issue a command for reading data Sb from the storage means 12 to the storage means 12 on the basis of a control command indicative of a transmission command received from the control section 18. The transmitting section 16 may convert the data Sb read out from the storage means 12 into the transmission packet of the above-mentioned SDTI-CP format. Further, the transmitting section may convert the converted transmission packet into serial transmission packet and output the serial transmission packet. The specific arrangement of the transmitting section 16 will be described later on.

The control section 18 may receive a transfer request transmitted from the receiving system 20 and may transmit a control command indicative of a transfer command to the interface 14.

The receiving system 20 may comprise a data receiving section (RX) 22, a storage means 24 for storing received data and a control section (CPUr) for monitoring the received data and which may transmit a data transmission instruction for receiving the next data. As the storage means 24, there can be used the hard disk device, the VTR used in the transmitting system 10, or the like.

An operation of the data transmitting system shown in FIG. 16 will be described. The receiving section 22 may convert the received data into parallel data, separate original data and other data (ancillary data, system item data, etc.) from the parallel data, store the original data such as video data in the data storage means (data storage section) 24 and may transmit information indicative of the presence or absence of the received data to the control section 26. The control section 26 may issue a control command indicative of data transmission instruction to the control section 18 based on the information indicative of the presence or absence of this data.

FIGS. 17A to 17F are timing charts to which reference will be made in explaining timings at which the transmission packets may be transmitted and received during the asynchronous mode in the data transmission system thus arranged as shown in FIG. 16.

The control section 26 provided in the receiving system 20 may recognize that no data is inputted to the receiving section 22 and that the transfer (storage) of all received data was completed, and may transmit a command that can be transferred to the transmission-side control section 18. At the same time, the above control section may memorize the fact that the transferable command was transmitted.

The control section 18 which received the transferable command may issue the data transfer command. In response to this command, the interface 14 may transmit a data valid pulse Sa (FIG. 17A) equivalent to 5 words to the storage means 12. In response thereto, the storage means 12 may output the data of 5 words to the transmitting section 16 with a delay of 1 word, for example, in consideration of the delay of data. The interface 14 may output a data valid pulse Sc delayed by 1 word (FIG. 17C) to the transmitting section 16.

Figure 17:
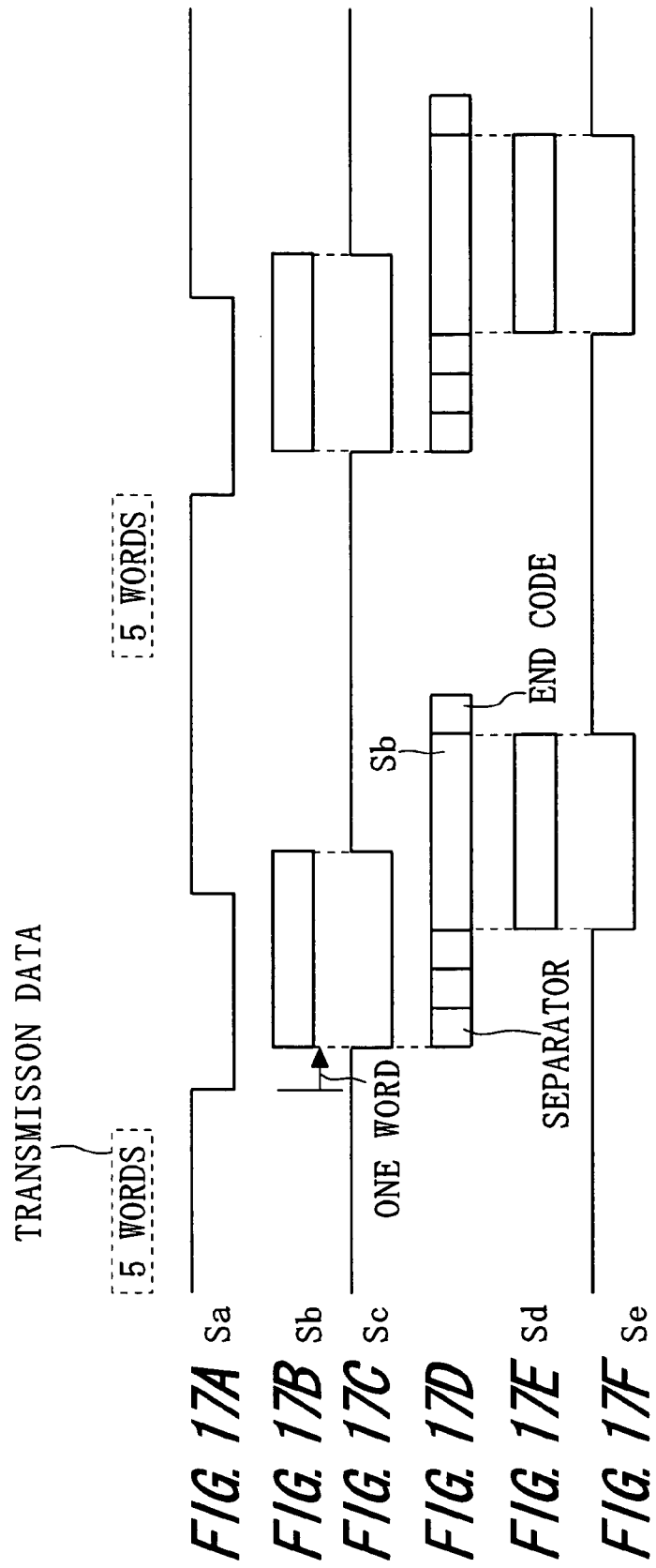
FIGS. 17A to 17F are timing charts to which reference will be made in explaining the manner in which data is transferred.

The transmitting section 16 may generate the transmission packet of the SDTI-CP format by inserting into the transmission data read out from the storage means 12 and into the areas of the system items, the picture items of the SDTI-CP format, or the like the above-mentioned data and by further inserting the separator, the end code defined by the SDTI format and further the EAV, the SAV defined by the SDTI format, or the like into the transmission data. FIG. 17D shows the transmission data inserted into the payload area of the transmission packet for convenience sake.

The receiving section 22 may generate a data valid pulse Se (FIG. 17F) from the received transmission packet, transmit and store valid data Sb (FIG. 17E) to and in the storage means 24 and may transmit the data valid pulse Set to the control section 26 to thereby monitor that the storage of data is finished. When the storage of data is ended, the control section 26 may again transmit the data transferable command. As described above, during the asynchronous transfer mode, the transmission packets may be transmitted and received by using a vacant time of the receiving system 20.

FIG. 19 shows the data transmitting system for transmitting data when the transfer mode is the synchronous transfer mode (standard speed one time as the normal speed) and the timing mode is the normal timing mode.

The receiving system 10 of this data transmitting system may comprise a video camera 42, an encoder 42 for generating compression-coded video data from the video signal supplied from this video camera 42 and an encoder 50 for encoding this compressed video data to provide transmission packets of SDTI-CP format.

The encoder 40 may generate MPEG-compressed video data by using an MPEG (Moving Picture Experts Group) encoder. The next encoder 50 may generate the transmission packets of SDTI-CP format by inserting into the areas of the system item, the picture item of the SDTI-CP format, or the like the above-mentioned compressed video data, the separator, the end code defined by the SDTI format, or the like and the EAV, the SAV defined by the SDTI format, or the like.

The receiving system 20 may comprise a decoder 60 for receiving the transmission packets of SDTI-CP format, an MPEG decoder 70 supplied with compressed video data separated by this decoder 60, a monitor means 80 for monitoring a picture of decoded video data supplied thereto and a storage means 82 for storing decoded video data. As the data storage means 82, there can be used the hard disk device, the semiconductor memory, the video tape recorder, or the like similarly to the storage means 12, 24 shown in FIG. 16.

A video signal outputted from the video camera 42 may be encoded as MPEG compressed video data by the MPEG encoder 40. Also, there may be generated an enable pulse which indicates the interval during which the compressed video data may be outputted. The compressed video data and the enable pulse may be supplied to the encoder 50 and thereby converted into the transmission packet of SDTI-CP format. This transmission packet may be converted into serial data and then transferred.

The compressed video data and the enable pulse may be separated from the received transmission packet. The compressed video data may be restored by using the enable pulse in the MPEG encoder 70.

In such data transmitting and receiving mode, the transmission of video data of one frame should be completed within a constant time period (time period of one video frame in this example). Then, data should be processed in synchronism with this video frame. To this end, the transmitting and receiving system may execute the following processing.

The transmitting system 10 may execute the processing synchronized with a video frame signal (pulse) (FIG. 19A) which is a reference signal within a station. The video frame signal may be a signal which can be obtained in synchronism with the fourth line of the video frame. The video camera 42 may output the video signals of the first and second fields in synchronism with this video frame (FIG. 19B).

The MPEG encoder 40 may delay the video signal of field period by one field in order to compress data at the frame unit (FIG. 19C). The timing of the transform processing may be synchronized with the second field. The frame video signal thus transformed may be compression-coded simultaneously (FIG. 19D). In this compression-coding, the coded quantity may become different depending upon the compressed block as shown in FIG. 20A so that enable pulses (FIGS. 19E and 20B) corresponding to the compressed data may be generated simultaneously. Since the MPEG compression-coding may be completed within one frame, the data compression processing of one frame can be ended until at least the third video frame period (period until the pulse F3 may be obtained).

The MPEG-compressed data and the enable pulses may be supplied to the next SDTI-CP encoder 50. This encoder 50 may generate respective SDTI-CP items which may be inserted into the payload portion, and may generate the SDTI-CP format transmission packet by adding the SDTI format header to the respective items and by adding further the EAV, the ANC, the SAV, or the like to the respective items. This transmission packet may be transmitted at a transmission speed such as 270 Mbps to the transmission system (communication cable, etc.) 45.

FIG. 19F shows transmission data which may be inserted into the payload area for convenience sake. This may apply for the following description as well. The transmission packet may be transmitted to the transmission system 45 in synchronism with the third video frame pulse F3 (FIG. 19F).

The receiving section 60 may generate the video frame pulse by extracting the received transmission packet, in this example, the vertical blanking data F (see FIG. 2) from the EAV area into which the end synchronizing code is inserted. The MPEG decoder 70, the monitor 80 and the storage means 82 may be operated in synchronism with this video frame pulse.

The receiving section 60 may be arranged as an SDTI-CP decoder in which the payload portion may be separated from the SDTI-CP format transmission packet and the respective items may be separated from the separated payload portions by using the system item data and thereby decoded (FIG. 19G). Simultaneously, the enable pulse also may be decoded (FIG. 19H). This decoding processing may be executed in synchronism with the video frame pulse.

Thereafter, the MPEG decoder 70 may decode the frame video signal and the enable pulse, respectively. Also, the decoded frame video signal may be transformed into a video signal of a field unit in synchronism with the next video frame pulse F5 (FIGS. 19I, 19J, 19K). The restored video signal of the field unit may be supplied to the monitor 80, in which a picture taken by the video camera 42 may be displayed real time and also stored in the storage means 82.

FIGS. 21A to 21K are timing charts to which reference will be made in explaining the manner in which data is transmitted and received when the transfer mode is the synchronous transfer mode and the timing mode is the advanced timing mode.

In this case, FIGS. 21A to 21E are the same as FIGS. 19A to 19E. Therefore, the SDTI-CP encoder 50 can finish the encode processing until the second field of the latter half of the second video frame period in which the frame pulse F2 is obtained, and also the processed transmission packet can be transmitted to the transmission system 45 from the second field (FIG. 21F). In this advanced timing mode, the transmission system 10 can reduce at least a time of one field.

On the other hand, while the received transmission packet is decoded by the SDTI-CP decoder 60, this decode processing can be started from the second field of the third video frame period in which the frame pules F3 is obtained (FIGS. 21G, 21H).

Since the video signal of the original field unit which may be outputted finally is synchronized with the frame pulse, it can be outputted in synchronism with the frame pulse F4 as shown in FIG. 21K. As a result, the receiving system 20 can reduce at least a time of one field. Thus, when this advanced timing mode is used, the transmission and reception time of one frame can be reduced on the whole of the transmission system, and hence the system delay can be minimized.

FIG. 22 shows a data transmission system which may transmit and receive the transmission packet of the above-mentioned SDTI-CP format when the transfer mode is the synchronous transfer mode and the timing mode is the dual timing mode. In particular, there is illustrated the arrangement of the data transmission system which may transmit and receive a progressive video signal of 525 lines/60 frames in the form of the above-mentioned transmission packet.

The receiving system 10 of this data transmission system may comprise a video camera 48, an encoder 46 for encoding a progressive video signal from this video camera 48 to generate compression-coded video data and an encoder 50 for adding added data to this compressed video data to generate the transmission packet of SDTI-CP format.

The encoder 50 may use the MPEG encoder to generate MPEG compressed video data. The next encoder 50 may insert the aforementioned compressed video data into the areas of the system item, the picture item of SDTI-CP format, or the like, may insert the separator, the end code defined by the SDTI format, or the like into the above-mentioned areas and may further insert the EAV, the SAV defined by the SDI format into the above-mentioned areas to thereby generate the transmission packet of SDTI-CP format.

Figure 18:
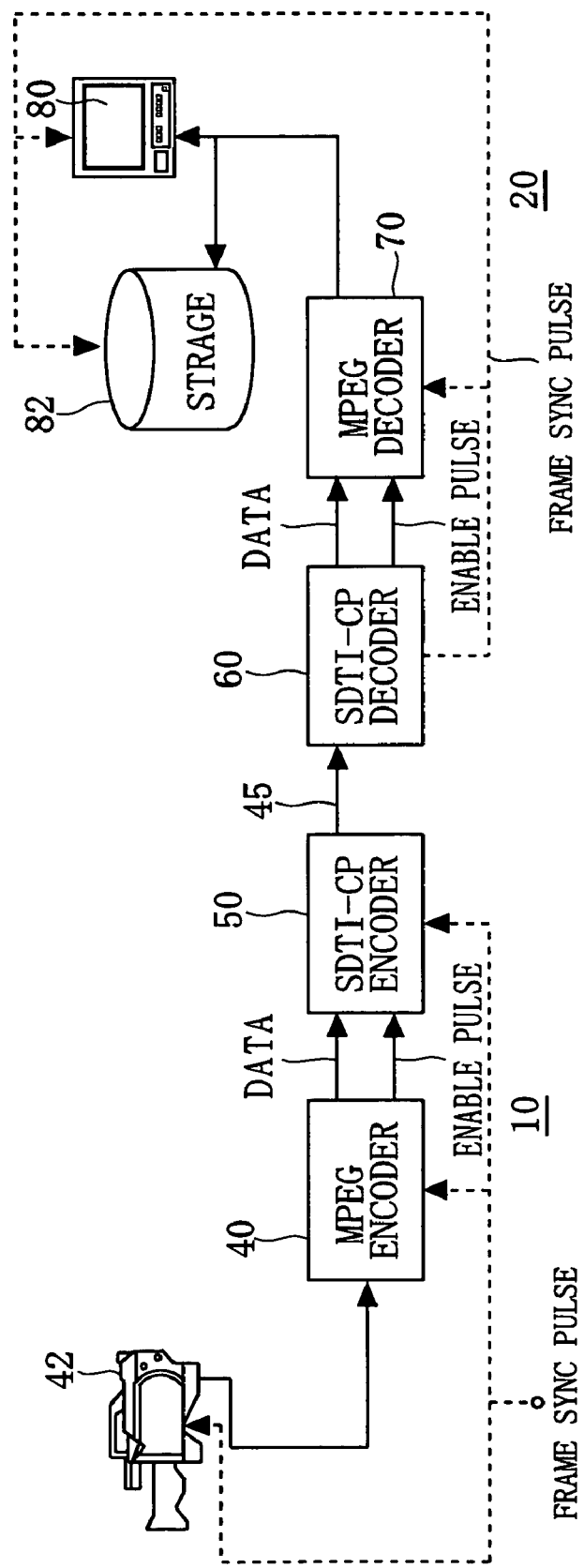
FIG. 18 is a block diagram showing the outline of the data transmission apparatus and to which reference will be made in explaining the synchronous transfer mode.

The receiving system 20 may comprise a decoder 60 for receiving the transmission packet of SDTI-CP format, an MPEG decoder 72 supplied with compressed video data separated by this decoder 60, a monitor means 84 for monitoring pictures of decoded video data and a storage means 82 for storing decoded video data. As the data storage means 82, there can be used the hard disk device, the semiconductor memory, the video tape recorder, or the like similarly to the storage means 82 shown in FIG. 18.

A progressive video signal outputted from the video camera 48 may be encoded by the MPEG encoder 46 as MPEG compressed video data. There may be generated an enable pulse which indicates the interval during which compressed video data is outputted. Since the MPEG encoder 46 may process the progressive video signal, it may not contain a field/frame conversion processing means. The compressed video data and the enable pulse may be supplied to the encoder 50 and thereby converted into the transmission packet of the above-mentioned SDTI-CP format. This transmission packet may be converted into the serial transmission packet and then transferred.

The compressed video data and the enable pulse may be separated from the received transmission packet. The MPEG encoder 71 may restore the progressive video signal from the compressed video data by using the enable pulse. Since the MPEG encoder 72 may process the progressive video signal, it may not contain the frame/field converting means.

FIGS. 23A to 23H are timing charts to which reference will be made in explaining the manner in which this data transmission system may transmit and receive data.

The transmitting system 10 may execute the processing synchronized with a video frame signal (pulse) (FIG. 23A) which is the reference signal within the station, for example. The video frame signal may be obtained in synchronism with the fourth line of the video frame. The video camera 48 may generate the progressive video signal in synchronism with the frame pulse (FIG. 23B).

In the case of the progressive video signal, there may be outputted a video signal corresponding to 2 frames during one video frame period as shown in FIGS. 23A to 23C. Since this video signal is the progressive video signal, the progressive video signal may be inputted to the MPEG encoder 46 and thereby data can be compressed and encoded. FIGS. 23C, 23D show the resultant compressed data and enable pulse.

Compressed data of the progressive video signal (frame 1) corresponding to the first field in the video frame period of one frame pulse F1 may be supplied to the SDTI-CP encoder 50, in which it may be encoded as the transmission packet of the SDTI-CP format by using the period of the second field. Compressed data of the progressive video signal (frame 2) from the second field may be supplied to the SDTI-CP encoder 50, in which it may be encoded as the transmission packet of the SDTI-CP format by using the first field in the video frame period of the frame pulse F2 (see FIG. 23E).

The transmission packets corresponding to the progressive video signals (frame 1 and 2) may be transmitted in synchronism with the first and second fields (pulses) in the video frame period of the same frame pulse F2 and may be decoded by the SDTI-CP decoder 60. The progressive video signal of the processed result and the enable pulse used at that time are illustrated in FIGS. 23F, 23G. Thereafter, the MPEG decoder 71 may decode the above progressive video signal to provide the original progressive video signal (FIG. 23H).

As described above, in the dual timing mode, it may become possible to monitor a picture during the video frame period of the frame pulse F2. In the above-mentioned timing mode, the system delay on the whole of the data transmission system can be minimized.

FIGS. 24A to 24C show a specific example of a transmission packet in the dual timing mode. FIG. 24B shows arrangements of picture items which are synchronized with the first and second fields, respectively. Accordingly, compressed video data (picture) of the first half may be located and transmitted in synchronism with the first field and compressed video data (picture) of the second half may be located and transmitted in synchronism with the second field.

Subsequently, the isochronous transfer mode (isochronous transfer mode) will be described. FIG. 25 shows a data transmission system according to the embodiment in which video signals of two video cameras 42, 43 may be multiplexed and can be transmitted during one video frame period which is the constant period.

The transmission system 10 in this data transmission system may comprise two video cameras 42, 43, MPEG encoders 40, 41 supplied with video signals from these video cameras and an encoder 50 for encoding the compressed video data from these MPEG encoders 40, 41 to provide the transmission packets of SDTI-CP format. The MPEG encoders 40, 41 may have the same arrangement. The encoder 50 may provide the transmission packet of the SDTI-CP format by multiplexing the compressed video data of the two systems outputted from the MPEG encoders 40, 41.

Accordingly, this encoder 50 may generate items of SDTI-CP format and may generate the transmission packet of SDTI-CP format by inserting the respective items into the payload area, inserting the above-mentioned header data into the ancillary area and further inserting the EAV and the SAV defined by the SDI format.

Figures 26A, 26B, 26C:
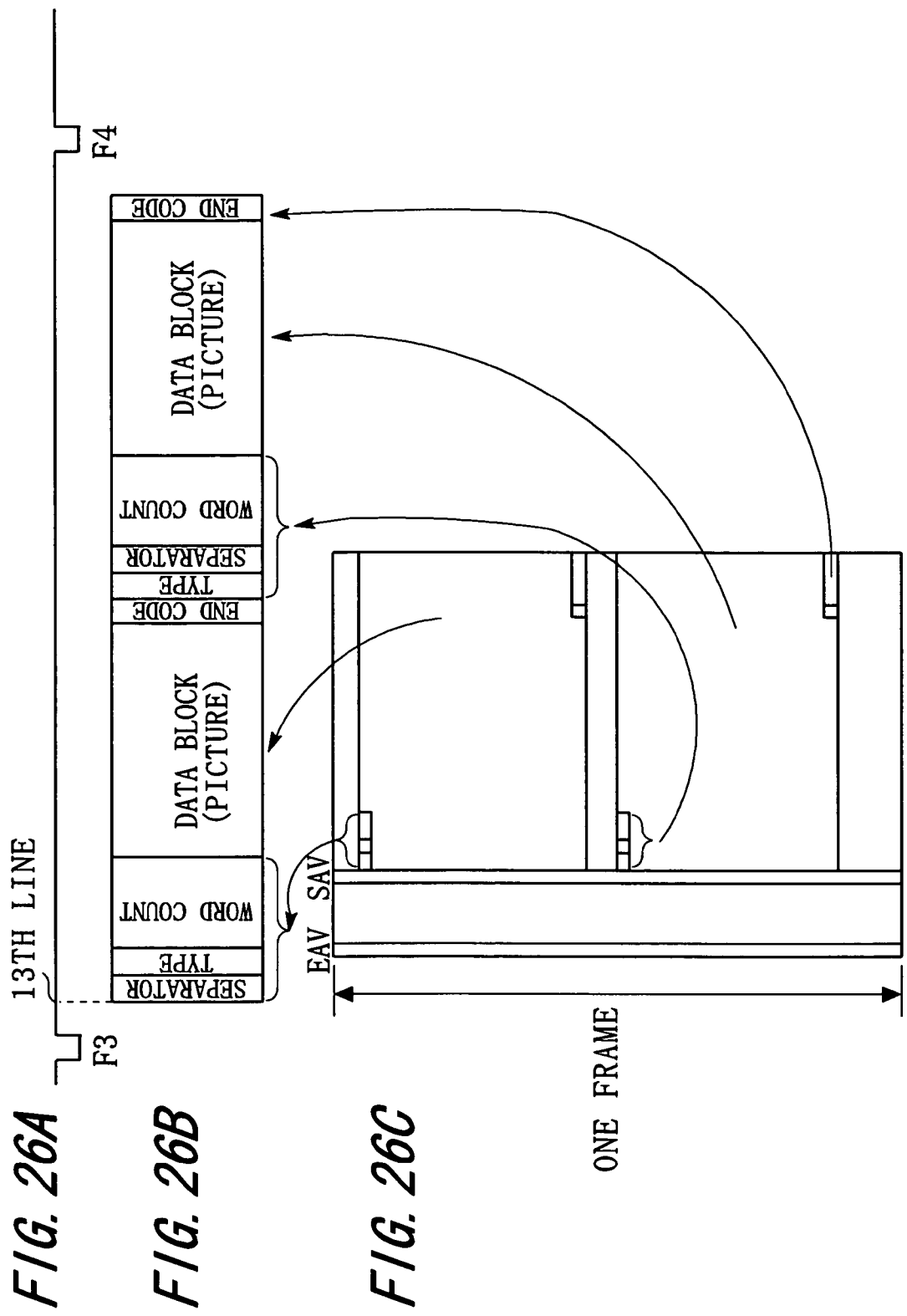
FIGS. 26A to 26C are diagrams showing an example of the manner in which multiplexed data are mapped.

FIGS. 26A to 26C show a specific example of the transmission packet in which the compressed data of the two systems may be multiplexed. FIG. 26B shows the arrangement of the multiplexed picture item in which the compressed video data (picture) of the video camera 43 may be multiplexed to the compressed video data (picture) of the video camera 42 under the condition that the separator and end code are respectively added thereto. Then, as shown in FIG. 26, the compressed video data (picture) of the video camera 42 may be located in the first half period of the video frame and the compressed video data (picture) of the video camera 43 may be located in the second half period and thereby transmitted.

The receiving system 20 in the data transmission system may comprise a decoder 60 for receiving the transmission packets of the SDTI-CP format, two MPEG decoders 70, 71 supplied with compressed video data outputted from this decoder 60, two monitor means 80, 81 supplied with video data outputted from these MPEG decoders 70, 71 and a storage means 83 for storing video data. The MPEG decoders 70, 71 may have the same arrangement. The decoder 60 may separate the transmission packet of the SDTI-CP format into compressed video data of two systems.

FIGS. 27A to 27T show timing charts in which the data transmission system thus arranged may transmit and receive data. FIGS. 27A to 27E are the same as FIGS. 19A to 19E, and FIGS. 27F to 27I are the same as FIGS. 19A to 19E.

The video cameras 42, 43 may output ordinary video signals (interlace signals) in synchronism with the station video frame signal (FIGS. 27A, 27B, 27F).

The MPEG encoders 40, 41 may encode the video signals to provide compressed video data of two systems after the field/frame conversion (FIGS. 27C, 27D, 27G, 27H). At the same time, the enable pulses may be outputted therefrom (FIGS. 27E, 27I).

The SDTI-CP encoder 50 may multiplex the compressed video data of the two systems to provide the transmission packet of the SDTI-CP format and may convert the same into the serial packet and thereby transferred (FIG. 27J).The SDTI-CP decoder 60 may decode the transmission packet thus received to provide the compressed video data of the two systems and the enable pulse (FIGS. 27K, 27L, 27P, 27Q). The compressed video data may be supplied to and decoded non-compressed video data and the enable pulses by the corresponding MPEG decoders 70, 71 (FIGS. 27M, 27N, 27R, 27S). Thereafter, the video data are field-converted and thereby obtained as the video signals of the two system.

FIGS. 28A to 28T and FIG. 25 are timing charts in which data are transferred during the advanced timing mode of the isochronous transfer mode when the data transmission system of FIG. 25 is used.

Since the transmission packet is transmitted in synchronism with the second field of the video frame period, the processing timing of the SDTI-CP encoder 50 may be shifted by one video field before in the case of FIG. 25 so that the frame conversion processing of the two systems from the second field and the MPEG encode processing may be executed simultaneously. Also, there may be generated the transmission packet of the SDTI-CP format in which the compressed video data of the two systems are multiplexed by using the resultant compressed video data of the two system. Then, this transmission packet may be transmitted in synchronism with the second field (FIGS. 28A to 28J).

Since all processing executed in the receiving system 20 may be advanced by one video field, the compressed video data of the two systems may be separated from the transmission packet and the MPEG data may be decoded from the second field of the video frame period of the frame pulse F3, and the field conversion may be executed from the first field of the video frame period of the frame pulse F4. Thus, there can be obtained the video data of the two systems from this second field (FIGS. 28K to 28T).

Since the delay time of the data transmission system can be decreased in the advanced timing mode as described above, the present invention is suitable for use with data transmission effected when a live relay may be effected between station studios.

Figure 29A:
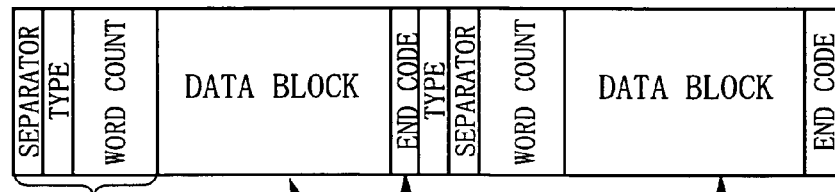
FIGS. 29A, 29B are diagrams showing an example of the manner in which data are mapped in the advanced timing mode.
Figure 29B:
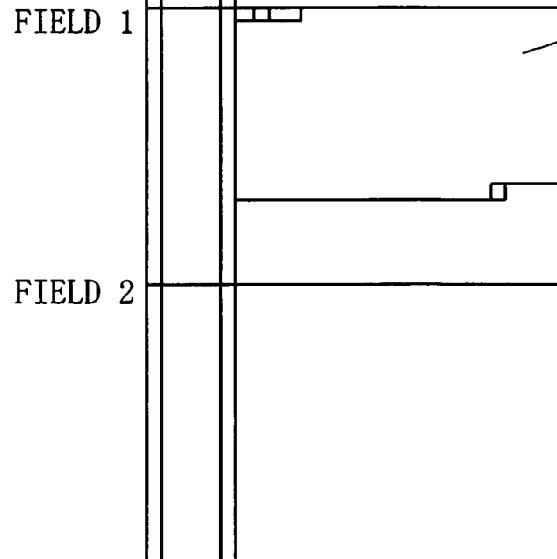

FIGS. 29A, 29B show a specific example of transmission packet in which compressed video data of the two systems are multiplexed in the isochronous transfer mode and in the advanced timing mode. FIG. 29A shows the arrangement of the multiplexed picture item in which the compressed video data (picture) of the video camera 43 may be multiplexed to the compressed video data (picture) of the video camera 42 under the condition that the separator and the end code were added thereto. Then, as shown in FIG. 29B, the compressed video data (picture) of the video camera 42 and the compressed video data (picture) of the video camera 43 may be located and transmitted from the second field of the video frame.

FIG. 30 shows the specific arrangement of the SDTI-CP encoder provided in the above-mentioned transmission system 10.

This encoder 50 may comprise a first formatter (SDTI-CP formatter) 51 supplied with MPEG compressed video data supplied to a terminal 52 and which may insert this compressed video data into the area such as the picture items inserted into the payload portion of the SDTI-CP format, a CPU 53 for outputting item header inserted into the respective items and the system items, a timing signal generator 54 for generating a timing signal used when the item header, the system item, or the like may be inserted into the payload portion, a second formatter (SDTI formatter) 55 for inserting added data (separator, end code, word count, etc.) defined by the SDTI format into these respective items inserted into the payload portion, a third formatter (SDI formatter) 56 for finally generating the transmission packet of the SDTI-CP format by inserting the EAV, the ANC and the SAV formatted by the SDI format and a P/S converter 57 for converting parallel data of transmission packet into serial data.

Information indicative of data length of the system item and information indicative of the header length of the content package may be supplied to the timing generator 54. The timing generator 54 may generate on the basis of these length information timing pulses at which the system item, the picture item or the like may be packed.

FIGS. 31A to 31E are timing charts showing the manner in which the SDTI-CP encoder may encode data.

The SDTI-CP formatter 51 may insert MPEG compressed data (FIG. 31A) supplied from the terminal 52 into the picture item. Further, the items shown in FIGS. 4 and 7 may be arranged by using header information of respective items. To this end, the CPU 53 may supply first added data necessary for formatting data in the form of the content package CP in the SDTI-CP format, i.e. the system item and the content package item header (CP header), respectively.

This CPU 53 may supply data indicative of the length of the system item and data indicative of the length of the CP header to the timing generator 54 from which there may be generated a data insertion enable pulse and a timing pulse (FIG. 31C shows only the enable pulse) synchronized with a field pulse V and a horizontal pulse H.

On the basis of the enable pulse and the timing pulse, the SDTI-CP formatter 51 may generate the system item and the MPEG compressed video data with the CP header added thereto shown in FIG. 31B.

The SDTI formatter 55 may generate SDTI formatted data shown in FIG. 31D by adding the second added data such as the separator, the word count and the end code defined by the SDTI format to the system item and the compressed video data. Further, the SDI formatter 56 may generate the transmission packet of the SDTI-CP format by adding the third added data of the end synchronizing code EAV, the ancillary data ANC and the start synchronizing code SAV defined by the SDI format to this SDTI format data. The transmission packet of this SDTI-CP format may be converted by the P/S converter 57 in the form of parallel to serial data and then transmitted to the transmission line 45. FIG. 31E shows the manner in which data may be located when the SDTI-CP format is developed to the frame.

As described above, according to this invention, in the data transmission method of transmitting the transmission packet of the SDTI format, the data indicative of the transfer mode of the transmission packet may be inserted into the payload area. Also, according to this invention, in the data transmission apparatus for transmitting the transmission packet of the SDTI format, the transmitting section for supplying transmitted data may include the means for inserting the data indicative of the transfer mode into the payload area. According to this arrangement, it may be possible to discriminate the transfer mode of the transmission packet by only checking the contents of data in this transfer mode.

Moreover, according to this invention, in the data transmission method for transmitting the transmission packet of the SDTI format, the data indicative of the timing mode of the transmission packet may be inserted into the payload area. Furthermore, according to this invention, in the data transmission apparatus for transmitting the transmission packet of the SDTI format, the transmitting section supplied with transmitted data may include the means for inserting the data indicative of the timing mode of the transmission packet into the payload area. According to this arrangement, it may be possible to discriminate the timing mode of the transmission packet by only checking the contents of data in the timing mode area.

INDUSTRIAL APPLICABILITY

This invention can be applied to the case in which the transmission packet of the SDTI-CP format in which the transfer mode and the timing mode area are prepared may be transmitted. Therefore, the present invention is suitable for the data transmission system within the station.

What is claimed is:

1. A data transmission method of transmitting a serial digital transfer interface transmission packet in which an interval of one line of a video frame comprises an end synchronizing code area in which an end synchronizing code is inserted, an ancillary data area into which ancillary data is inserted, a start synchronizing code area into which a start synchronizing code is inserted, and a payload area into which data containing a video signal is inserted, said data transmission method comprising the steps of:

a first step of inserting data indicative of a transfer mode of said transmission packet into said payload area; and a second step of transferring said transmission packet into which the data indicative of said transfer mode was inserted at said first step in the form of serial data, whereby the position within said payload area where said data indicative of said transfer mode is inserted is based on both said transfer mode and a timing mode of said transmission packet, and wherein said video signal is data compressed according to the MPEG standard.

2. A data transmission method as claimed in claim 1, wherein said data indicative of the transfer mode of said transmission packet is inserted into the payload area at its transfer mode area near a type area into which type data indicative of the type of data of a data block area into which said data is inserted is inserted.

3. A data transmission method as claimed in claim 1, wherein said data indicating said transfer mode is data indicative of any one of the asynchronous transfer mode in which said transmission packet converted into serial data is transferred between the transmission side and the reception side in the asynchronous state, the synchronous transfer mode in which said transmission packet converted into serial data is transmitted under the state that the transmission side and the reception side are synchronized with each other and the isochronous transfer mode in which said transmission packet converted into serial data is transmitted at a high speed and in a multiplexed fashion under the state that said transmission side and said reception side are synchronized with each other.

4. A data transmission apparatus for transmitting a serial digital transfer interface transmission packet in which an interval of one line of a video frame comprises an end synchronizing code area into which an end synchronizing code is inserted, an ancillary data area into which ancillary data is inserted, a start synchronizing code area into which a start synchronizing code is inserted and a payload area into which data containing a video signal and/or an audio signal is inserted, said data transmission apparatus comprising:

a data compression device for compressing said video signal;

an encoder for converting data to said serial digital transfer interface format by inserting said compressed data into said payload area; and a parallel-to-serial converter for converting this encoded output into serial data, wherein said encoder includes means for inserting data indicative of the transfer mode of said transmission packet into said payload area;

wherein a position at which said transmission packet is located at and transmitted from is a function of said transfer mode and a timing mode, wherein said data compression device is an MPEG data compression device for compressing data according to the MPEG standard, and whereby the position within said payload area where said data indicative of said transfer mode is inserted is based on both said transfer mode and a timing mode of said transmission packet.

5. A data transmission apparatus according to claim 4, further comprising means for inserting the data indicative of the transfer mode of said transmission packet into said payload area at its transfer mode area near a type area into which type data indicative of the type of data in a data block area into which said data is inserted is inserted.

6. A data transmission apparatus as claimed in claim 4, wherein said encoder includes a first formatter for formatting said compressed data to provide said compressed data and first added data in the form of packaged data, a second formatter for formatting first formatted data generated from said first formatter and second added data defined by the serial digital transfer interface format to provide packaged data, and a third formatter for adding third data defined by the serial digital interface format to said serial digital transfer interface format data generated by said second formatter to provide packaged data.

7. A data transmission method of transmitting a serial digital transfer interface transmission packet in which an interval of one line of a video frame comprises an end synchronizing code area in which an end synchronizing code is inserted, an ancillary data area into which ancillary data is inserted, a start synchronizing code area into which a start synchronizing code is inserted and a payload area into which data containing a video signal is inserted, said data transmission method comprising the steps of:

a first step of inserting data indicative of a timing mode of said transmission packet into said payload area; and a second step of transferring said transmission packet into which said timing mode was inserted at said first step in the form of serial data;

wherein a position at which said transmission packet is located at and transmitted from is a function of a transfer mode and said timing mode, wherein said video signal is data compressed according to the MPEG standard, and whereby the position within said payload area where said data indicative of said timing mode is inserted is based on both said timing mode and a transfer mode of said transmission packet.

8. A data transmission method as claimed in claim 7, wherein said data indicative of the timing mode is inserted into said payload area at its area near a type area into which type data indicative of the type of data in a data block area into which said data is inserted is inserted.

9. A data transmission method as claimed in claim 8, wherein said timing area has inserted thereto data indicating whether a timing mode is a normal timing mode in which said transmission packet is transmitted at a timing of transmitting a first field of said video frame, an advanced timing mode in which said transmission packet is transmitted at a timing of transmitting a second field of said video frame or a dual timing mode in which said transmission packet is transmitted at a timing of transmitting the first and second fields of said video frame.

10. A data transmission apparatus for transmitting a serial digital transfer interface transmission packet in which an interval of one line of a video frame comprises an end synchronizing code area into which an end synchronizing code is inserted, an ancillary data area into which ancillary data is inserted, a start synchronizing code area into which a start synchronizing code is inserted and a payload area into which data containing a video signal and/or an audio signals is inserted, said data transmission apparatus comprising:

a data compression device for compressing said video signal;

an encoder for encoding data to said serial digital transfer interface format by inserting said compressed data into said payload area of said transmission packet; and a parallel-to-serial converter for converting this encoded output into to serial data, wherein said encoder includes means for inserting data indicative of a timing mode of said transmission packet into said payload area;

wherein a position at which said transmission packet is located at and transmitted from is a function of a transfer mode and said timing mode, wherein said data compression device is an MPEG data compression device for compressing data according to the MPEG standard, and whereby the position within said payload area where said data indicative of said timing mode is inserted is based on both said timing mode and a transfer mode of said transmission packet.

11. A data transmission apparatus according to claim 10, further comprising means for inserting data indicative of the timing mode of said transmission packet into said payload area at its timing mode area near a type area into which type data indicative of the type of data of a data block area into which said data is inserted is inserted.

12. A data transmission apparatus according to claim 10, wherein said encoder includes a first formatter for formatting said compressed data to provide said compressed data and first added data in the form of packaged data a second formatter for formatting first formatted data generated from said first formatter and second added data defined by the serial digital transfer interface format to provide packaged data, and a third formatter for adding third data defined by the serial digital interface format to said serial digital transfer interface format data generated by said second formatter to provide packaged data.

* * * * *